United States Patent
Hayakawa et al.

[11] Patent Number: 6,104,540
[45] Date of Patent: *Aug. 15, 2000

[54] DECENTERED OPTICAL SYSTEM

[75] Inventors: Kazuhito Hayakawa; Takayoshi Togino, both of Hachioji, Japan

[73] Assignee: Olympus Optical Co., Ltd., Tokyo, Japan

[*] Notice: This patent is subject to a terminal disclaimer.

[21] Appl. No.: 09/227,212

[22] Filed: Jan. 8, 1999

Related U.S. Application Data

[63] Continuation-in-part of application No. 08/852,409, May 7, 1997, Pat. No. 5,917,656.

[30] Foreign Application Priority Data

Nov. 5, 1996 [JP] Japan ................................. 8-292686
Apr. 18, 1997 [JP] Japan ................................. 9-101838

[51] Int. Cl.⁷ .......................... G02B 27/14; G02B 3/02
[52] U.S. Cl. ..................................... 359/637; 359/720
[58] Field of Search ................................. 359/631, 637, 359/206, 216, 217, 676, 720; 250/494.1

[56] References Cited

U.S. PATENT DOCUMENTS

| | | | |
|---|---|---|---|
| 3,583,790 | 6/1971 | Baker | 350/184 |
| 4,650,292 | 3/1987 | Baker et al. | 350/432 |
| 5,594,588 | 1/1997 | Togino | 359/631 |
| 5,596,433 | 1/1997 | Konuma | 359/631 |
| 5,619,377 | 4/1997 | Rallison | 359/631 |
| 5,917,656 | 6/1999 | Hayakawa et al. | 359/637 |

FOREIGN PATENT DOCUMENTS

| | | | |
|---|---|---|---|
| 0 687 932 | 12/1995 | European Pat. Off. | G02B 27/00 |
| 0 730 183 | 9/1996 | European Pat. Off. | G02B 27/01 |
| 7-333551 | 12/1995 | Japan | G02B 27/02 |
| 8-234137 | 9/1996 | Japan | G02B 27/02 |

*Primary Examiner*—Georgia Epps
*Assistant Examiner*—David Spector
*Attorney, Agent, or Firm*—Pillsbury Madison & Sutro LLP

[57] ABSTRACT

An optical system capable of correcting aberrations due to three-dimensional decentration by using a rotationally asymmetric surface having no plane of symmetry. The optical system includes, from the ray bundle entrance side, a first surface (3) serving as both a first transmitting surface and a second reflecting surface, a second surface (4) as a first reflecting surface, and a third surface (5) as a second transmitting surface. The space between these surfaces is filled with a medium having a refractive index larger than 1. The first surface (3) is a three-dimensional surface having no plane of symmetry.

20 Claims, 20 Drawing Sheets

FIG. 8
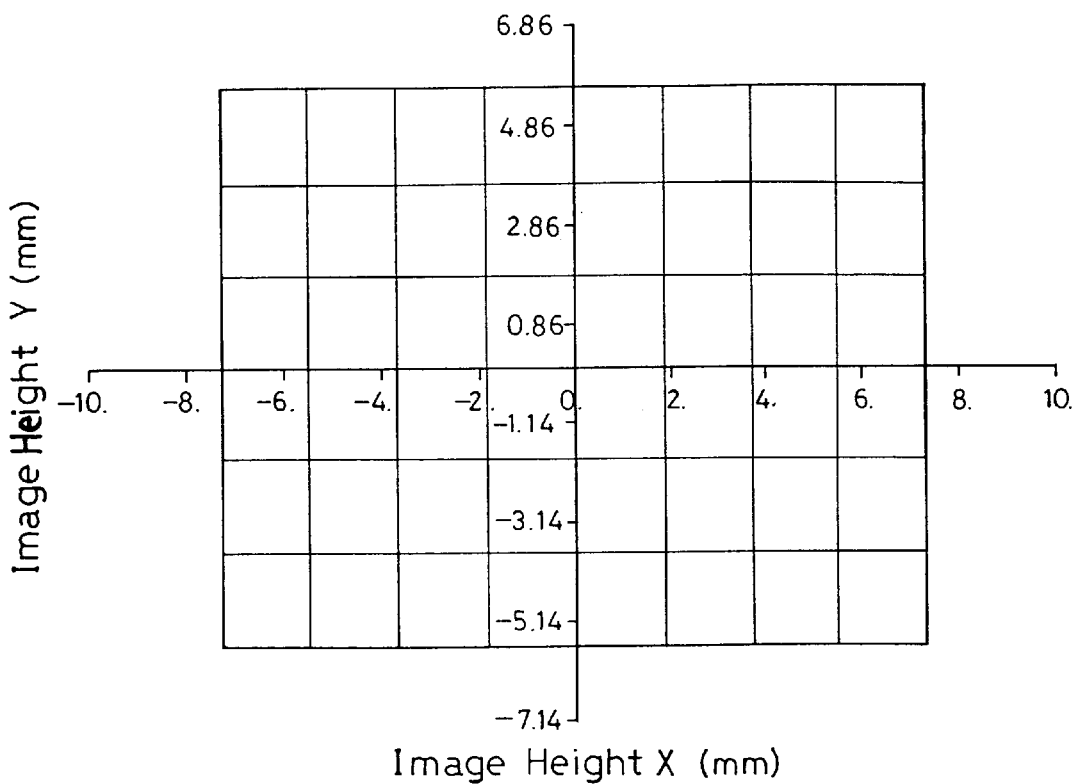
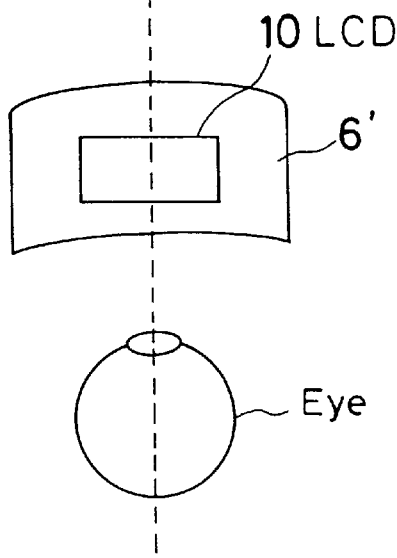
FIG. 9(a)
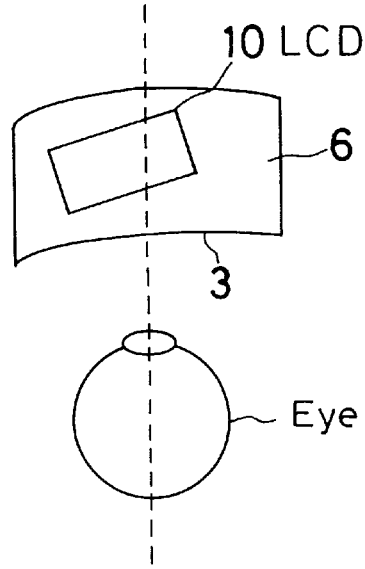
FIG. 9(b)

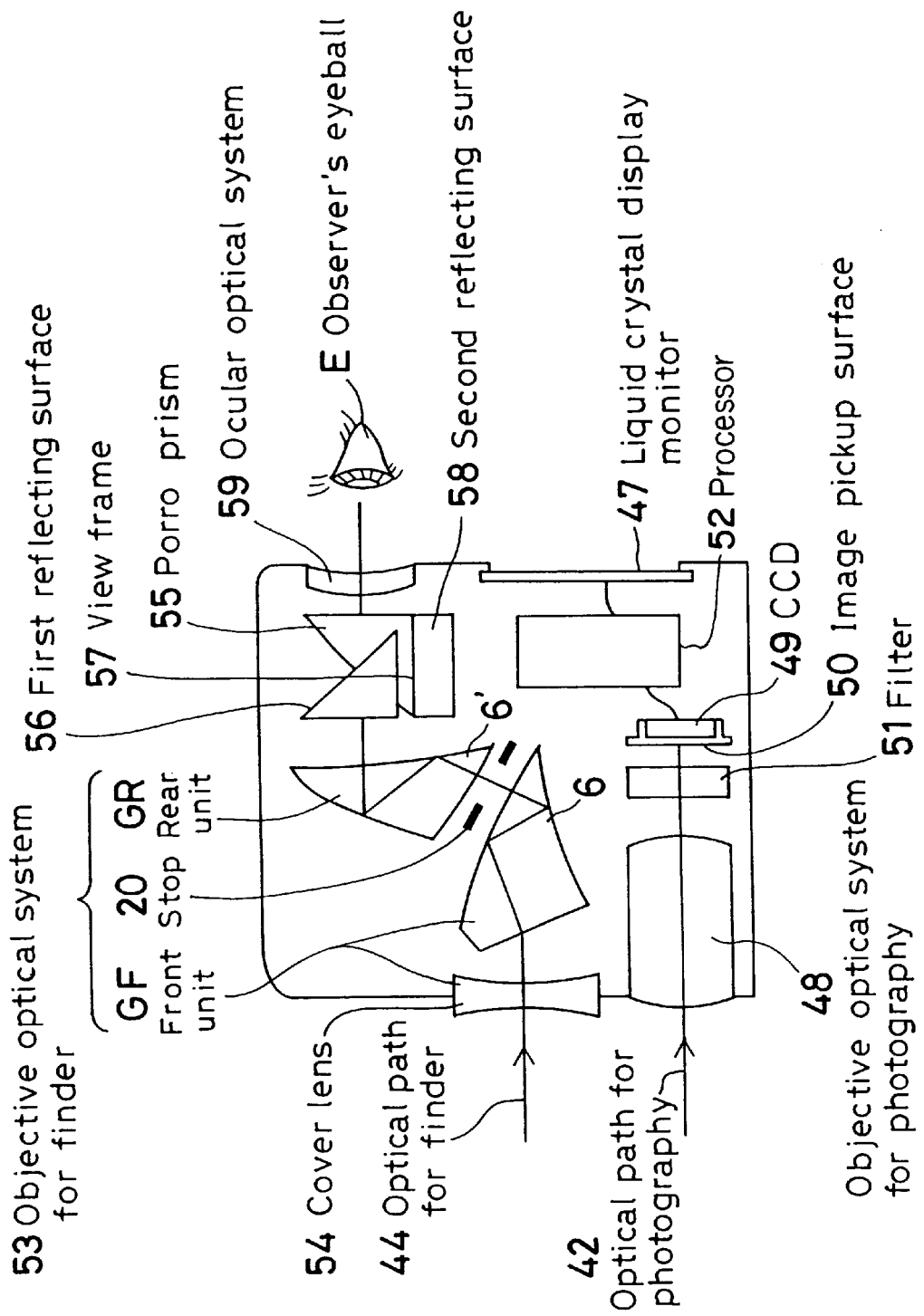

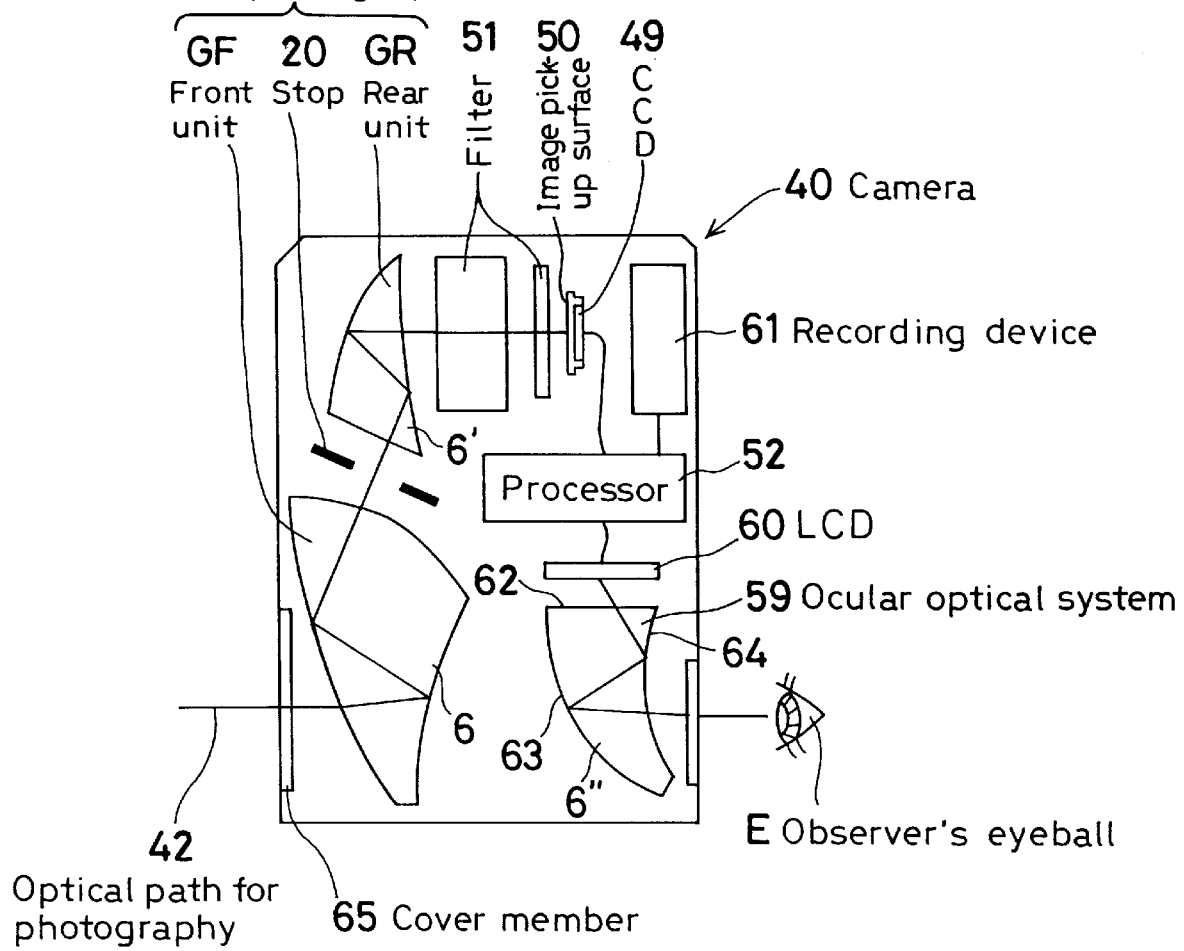

80 Objective optical system for observation

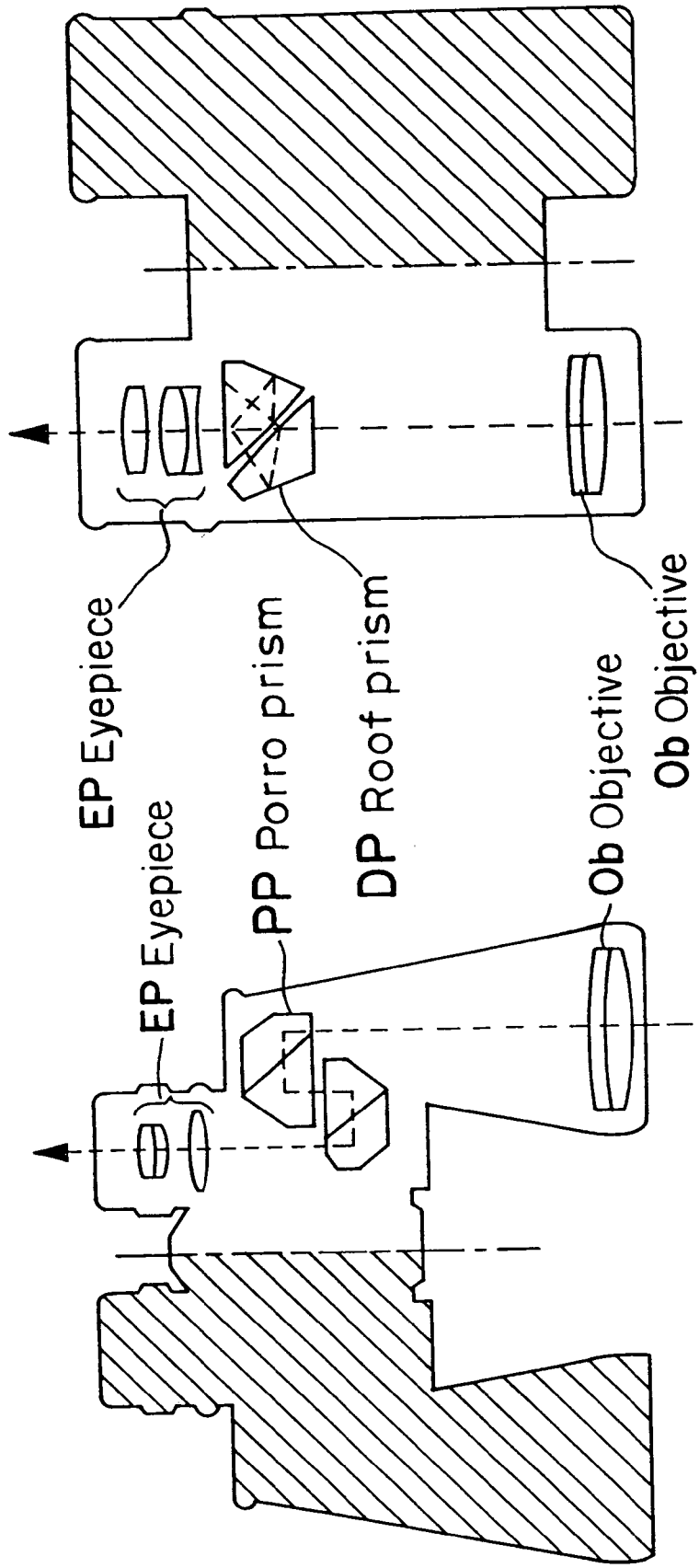

DECENTERED OPTICAL SYSTEM

This is a Continuation-in-Part of National appln. Ser. No. 08/852,409 (now U.S. Pat. No. 5,917,656) filed May 7, 1997.

BACKGROUND OF THE INVENTION

The present invention relates to a decentered optical system and, more particularly, to a decentered optical system including a rotationally asymmetric surface.

As a conventional observation optical system, Japanese Pat. Appln. Laid-Open (KOKAI) No. 7-333551 proposes a back-coated mirror type decentered optical system using an anamorphic surface and a toric surface as curved surfaces having one plane of symmetry.

However, aberrations due to three-dimensional decentration cannot be corrected in such an optical system that uses curved surfaces having one plane of symmetry as reflecting or other surfaces.

SUMMARY OF THE INVENTION

In view of the above-described problem associated with the conventional technology, an object of the present invention is to provide an optical system capable of correcting aberrations due to three-dimensional decentration by using a rotationally asymmetric surface having no plane of symmetry.

To attain the above-described object, the present invention provides an ocular optical system including an image-forming member that forms an observation image, and a decentered optical system that leads the observation image to a pupil. The decentered optical system has at least one transmitting surface and at least one reflecting surface. A space lying between these surfaces is filled with a medium having a refractive index larger than 1. The decentered optical system has at least one optical surface formed from a rotationally asymmetric curved surface having no plane of symmetry.

It is desirable that the rotationally asymmetric curved surface having no plane of symmetry should be provided on at least one reflecting surface of the decentered optical system.

The reflecting surface is reflectively coated with a thin film of metal, for example, aluminum or silver, or a multilayer dielectric film. Alternatively, the reflecting surface is a totally reflecting surface.

The present invention includes a head-mounted image observation apparatus having the above-described ocular optical system, and an image-forming device for displaying the observation image in the form of an electronic image.

The present invention further includes a camera having an image-forming device including an image-forming optical system that forms an object image, and the above-described ocular optical system for viewing the object image as an observation image.

The present invention further includes a camera having an image-forming device for displaying an object image in the form of an electronic image, and the above-described ocular optical system for viewing the electronic image as an observation image.

In addition, the present invention provides an image-forming optical system including a decentered optical system having at least one transmitting surface and at least one reflecting surface. A space lying between these surfaces is filled with a medium having a refractive index larger than 1. The decentered optical system has at least one optical surface formed from a rotationally asymmetric curved surface having no plane of symmetry.

It is desirable that the rotationally asymmetric curved surface having no plane of symmetry should be provided on at least one reflecting surface of the decentered optical system.

The reflecting surface is reflectively coated with a thin film of a metal, for example, aluminum or silver, or a multilayer dielectric film. Alternatively, the reflecting surface is a totally reflecting surface.

The present invention includes an endoscope having the above-described image-forming optical system, and an image pickup device that receives an object image formed by the image-forming optical system.

The present invention further includes an endoscope having the above-described image-forming optical system, and an image fiber guide that receives an object image formed by the image-forming optical system.

The present invention further includes an endoscope having the above-described image-forming optical system, and a relay lens that receives an object image formed by the image-forming optical system.

The present invention further includes an electronic camera having the above-described image-forming optical system, and an image pickup device that receives an object image formed by the image-forming optical system. In this case, the electronic camera may have a liquid crystal display monitor that observably displays the object image received by the image pickup device.

The present invention further includes a camera wherein an object image produced by the above-described image-forming optical system is formed on a film plane to take a photograph of an object.

The present invention further includes a camera having the above-described image-forming optical system, and an ocular optical system for viewing an object image formed by the image-forming optical system.

In addition, the present invention provides a pair of binoculars including a right optical system for leading an object image to a right eye, and a left optical system for leading an object image to a left eye. The right optical system includes a right decentered optical system acting as a part of an image-forming optical system and/or as a part of an ocular optical system. The right decentered optical system is placed in an image erecting prism. The left optical system includes a left decentered optical system acting as a part of an image-forming optical system and/or as a part of an ocular optical system. The left decentered optical system is placed in an image erecting prism. The right and left decentered optical systems each have at least one transmitting surface and at least one reflecting surface. A space lying between these surfaces is filled with a medium having a refractive index larger than 1. The right and left decentered optical systems each have at least one optical surface formed from a rotationally asymmetric curved surface having no plane of symmetry.

In addition, the present invention provides a microscope including an image erecting prism for erecting an object image formed by an objective optical system, and an ocular optical system. The image erecting prism contains a decentered optical system acting as a part of the ocular optical system. The decentered optical system has at least one transmitting surface and at least one reflecting surface. A space lying between these surfaces is filled with a medium having a refractive index larger than 1. The decentered optical system has at least one optical surface formed from a rotationally asymmetric curved surface having no plane of symmetry.

The decentered optical system may include, in the order of forward or backward ray tracing, a first surface serving as both a first transmitting surface and a second reflecting surface; a second surface as a first reflecting surface; and a third surface as a second transmitting surface.

In this case, for example, the first surface may be formed from a curved surface having no plane of symmetry. It is a matter of course that the other surfaces may be formed from curved surfaces having no plane of symmetry.

According to the present invention, a rotationally asymmetric surface is formed from a curved surface having no plane of symmetry. Therefore, it is possible to correct rotationally asymmetric aberration having no plane of symmetry that is produced by a three-dimensionally decentered optical system. Thus, it is possible to provide a decentered prism optical system or the like which is compact and has minimal aberrations and which is suitable for use as an ocular optical system used in a head-mounted image observation apparatus or the like.

The arrangement and operation of the present invention will be described below more specifically.

The basic decentered optical system according to the present invention is characterized by having at least one curved surface having no plane of symmetry as a curved surface constituting the optical system.

In a case where the decentered optical system is used, for example, as an ocular optical system of a head-mounted image display apparatus, or as an image-forming optical system of a camera, an endoscope, etc., it is necessary in order to eliminate a dead space and minimize the overall size of the apparatus to dispose an image display device or an image-formation plane and each optical surface constituting the decentered optical system such that the constituent elements are accommodated in the apparatus in as compact a form as possible. Consequently, the optical system must inevitably be decentered three-dimensionally, and this causes rotationally asymmetric aberration to occur. It is impossible to correct the rotationally asymmetric aberration by only a rotationally symmetric optical system. The best surface configuration for correcting the rotationally asymmetric aberration due to three-dimensional decentration is a rotationally asymmetric surface. Therefore, in the decentered optical system according to the present invention, a rotationally asymmetric surface having no plane of symmetry is disposed in the optical system to effect aberration correction.

As a rotationally asymmetric surface having no plane of symmetry, the present invention uses a three-dimensional surface as defined by the following equation. The Z-axis of the defining equation is the axis of the three-dimensional surface.

$$Z = C_2 + C_3y + C_4x + C_5y^2 + C_6yx + C_7x^2 + C_8y^3 + \quad \text{(a)}$$
$$C_9y^2x + C_{10}yx^2 + C_{11}x^3 + C_{12}y^4 + C_{13}y^3x + C_{14}y^2x^2 +$$
$$C_{15}yx^3 + C_{16}x^4 + C_{17}y^5 + C_{18}y^4x + C_{19}y^3x^2 + C_{20}y^2x^3 +$$
$$C_{21}yx^4 + C_{22}x^5 + C_{23}y^6 + C_{24}y^5x + C_{25}y^4x^2 + C_{26}y^3x^3 +$$
$$C_{27}y^2x^4 + C_{28}yx^5 + C_{29}x^6 + C_{30}y^7 + C_{31}y^6x + C_{32}y^5x^2 +$$
$$C_{33}y^4x^3 + C_{34}y^3x^4 + C_{35}y^2x^5 + C_{36}yx^6 + C_{37}x^7$$

where $C_m$ (m is an integer of 2 or higher) are coefficients.

In general, the above-defined three-dimensional surface has no plane of symmetry in the XZ-plane nor the YZ-plane.

The defining equation (a) generally expresses a curved surface APS (Asymmetric Polynomial Surface) which is rotationally asymmetric and has no plane of symmetry according to the present invention.

In particular, it is important to satisfy the following condition:

$$C_m[x^{2n+1}] \neq 0 \quad \text{(b-1)}$$

where $C_m[x^{2n+1}]$ denotes the coefficient of each term with an odd-numbered power of x ($x^{2n+1}$, where n is an integer) in Eq.(a).

A rotationally asymmetric surface that satisfies the condition (b-1) has no symmetry in the surface itself and therefore provides a high degree of design freedom to correct rotationally asymmetric aberration due to decentration. Accordingly, such a rotationally asymmetric surface is desirable from the viewpoint of improving the aberration correcting capability.

It is desirable for $C_m[x^{2n+1}]$ to satisfy the following condition:

$$C_m[x^{2n+1}] < -0.5 \times 10^{-8}$$
$$C_m[x^{2n+1}] > +5.0 \times 10^{-8} \quad \text{(b-2)}$$

It is most desirable to satisfy the condition (b-1) in order to correct rotationally asymmetric aberration due to decentration. However, it is necessary to take into consideration manufacturing errors in the actual designing and production of an optical system. That is, in a case where a rotationally asymmetric surface is designed to satisfy the condition $C_m[x^{2n+1}] \neq 0$, even if $C_m[x^{2n+1}] = \pm 1.0 \times 10^{-100}$ is set, for example, the variation in the surface accuracy of the actually produced optical surfaces is so larger that $C_m[x^{2n+1}] \neq 0$ and $C_m[x^{2n+1}] = \pm 1.0 \times 10^{-100}$ cannot be distinguished from each other. Therefore, in order to ensure the design freedom while taking into account manufacturing errors to thereby improve the aberration correcting performance, it is desirable to satisfy the above condition (b-2), i.e. to design a rotationally asymmetric surface such that $C_m[x^{2n+1}]$ should be outside the range of $\pm 5.0 \times 10^{-8}$, inclusive of zero.

The above-described APS can also be defined by Zernike polynomials. That is, the configuration of the APS may be defined by the following equation (c). The Z-axis of the defining equation (c) is the axis of Zernike polynomial.

$x = R \times \cos(A)$ $y = R \times \sin(A)$ $Z = D_2$ $+ D_3R \cos(A) + D_4R \sin(A)$ $+ D_5R^2 \cos(2A) + D_6(R^2-1) + D_7R^2 \sin(2A)$ $+ D_8R^3 \cos(3A) + D_9(3R^3-2R) \cos(A)$ $+ D_{10}(3R^3-2R) \sin(A) + D_{11}R^3 \sin(3A)$ $+ D_{12}R^4 \cos(4A) + D_{13}(4R^4-3R^2) \cos(2A)$ $+ D_{14}(6R^4-6R^2+1) + D_{15}(4R^4-3R^2) \sin(2A)$ $+ D_{16}R^4 \sin(4A)$ $+ D_{17}R^5 \cos(5A) + D_{18}(5R^5-4R^3) \cos(3A)$ $+ D_{19}(10R^5-12R^3+3R) \cos(A)$ $+ D_{20}(10R^5-12R^3+3R) \sin(A)$ $$+D_{21}(5R^5-4R^3)\sin(3A)+D_{22}R^5\sin(5A)$$

$$+D_{23}R^6\cos(6A)+D_{24}(6R^6-5R^4)\cos(4A)$$

$$+D_{25}(15R^6-20R^4+6R^2)\cos(2A)$$

$$+D_{26}(20R^6-30R^4+12R^2-1)$$

$$+D_{27}(15R^6-20R^4+6R^2)\sin(2A)$$

$$+D_{28}(6R^6-5R^4)\sin(4A)+D_{29}R^6\sin(6A) \qquad (c)$$

where $D_m$ (m is an integer of 2 or higher) are coefficients.

It should be noted that the above defining equations are shown as merely illustrative examples of APS, and that the same advantageous effects are obtained with respect to any other defining equation.

It is desirable that the decentered optical system should have at least one transmitting surface and at least one reflecting surface, and that a space lying between these surfaces should be filled with a medium having a refractive index larger than 1.

It is desirable for the reflecting surface to be a surface having totally reflecting action or reflecting action. If the reflecting surface is a totally reflecting surface tilted with respect to light rays so that the light rays are incident thereon at an angle exceeding the critical angle, a high reflectivity can be obtained. The reflecting surface is preferably a reflecting surface having a thin film of a metal, e.g. aluminum or silver, formed thereon, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity, semitransparent surface or minimal absorption is to be formed.

It is desirable that, as shown in FIG. 1(a), the decentered optical system 6 should include, in the order of forward or backward ray tracing, a first surface 3 serving as both a first transmitting surface and a second reflecting surface; a second surface 4 as a first reflecting surface; and a third surface 5 as a second transmitting surface. The reason for this is that the above arrangement makes it possible to construct a compact optical system providing a high resolution and a wide field angle when the decentered optical system is used to form an ocular optical system used in a head-mounted image observation apparatus or the like or an image-forming optical system used in a finder optical system or the like.

The decentered optical system 6 may include, as shown for example in FIG. 6(a), a first surface 3 serving as both a first transmitting surface and a second reflecting surface; a second surface 4 as a first reflecting surface; a fourth surface 8 as a third reflecting surface; and a third surface 5 as a second transmitting surface. Other surface arrangements may also be adopted.

In these cases, it is desirable to use an APS according to the present invention as at least the first surface 3 from the viewpoint of correcting rotationally asymmetric aberration due to three-dimensional decentration.

In the case of an image-forming optical system, as shown in FIG. 1(a), a light ray emanating from the object center and passing through the center of a pupil 1 to reach the center of an image 7 in the forward ray tracing is defined as an axial principal ray 2. In the case of an ocular optical system, a light ray passing through the center of the pupil 1 and reaching the center of the image or image display device 7 in the backward ray tracing is defined as an axial principal ray 2 (it should, however, be noted that when the center of an image display device cannot specifically be defined, e.g. in the case of a trapezoidal image display device, the intersection of the diagonal lines is defined as a center thereof). The direction of the axial principal ray 2 from the pupil 1 to the first surface 3 of the decentered optical system 6 is defined as a positive direction of Z-axis. Assuming a line segment extending from the center of the image or image display device 7 perpendicularly to the Z-axis, an arbitrary direction in which the line segment tilts in the range of angle $\Delta Y$ that satisfies the following condition (0-1) in a plane perpendicular to the Z-axis is defined as a positive direction of Y-axis ($\Delta Y$ is an angle indicating the degree to which the line segment extending from the center of the image or image display device 7 perpendicularly to the Z-axis tilts from the Y-axis). An axis that constitutes an orthogonal coordinate system in combination with the Y- and Z-axes is defined as an X-axis. It should be noted that because $\Delta Y$ is given by the following condition (0-1), the Y-axis has freedom within the range defined by the condition (0-1), and that the following conditions (1-1) to (9-3) should be satisfied in any case where the Y-axis is variable within the range of $\Delta Y$.

$$-20°\leq\Delta Y\leq 20° \qquad (0-1)$$

If the angle $\Delta Y$ is set outside the range of $\pm 20°$, the degree of freedom of the position of the Y-axis becomes excessively large, resulting in a large amount of change of the values of the following conditions (1-1) to (9-3). Consequently, the criticality significance of the conditions (1-1) to (9-3) is essentially lost. Therefore, it is undesirable to set $\Delta Y$ outside the range of $\pm 20°$.

It is more desirable for the angle $\Delta Y$ to fall within the range defined by the following condition (0-2):

$$-10°\leq\Delta Y\leq 10° \qquad (0-2)$$

If the angle $\Delta Y$ is set within the range defined by the condition (0-2) to narrow the degree of freedom of the position of the Y-axis, the amount of change of the values of the following conditions (1-1) to (9-3) can be reduced more effectively than in the case of the condition (0-1), and the criticality significance of each condition is enhanced. Accordingly, it becomes possible to design an even more favorable decentered optical system.

Assuming that X-, Y- and Z-axes are defined as stated above, and that DY denotes a difference between the value of the tangent of a line normal to the at least one rotationally asymmetric surface in the YZ-plane at a position where a principal ray at the maximum field angle in the direction X impinges on the surface and the value of the tangent of a line normal to the surface in the YZ-plane at a position where the axial principal ray impinges on the surface, it is desirable to satisfy the following condition:

$$-0.1<DY<0.1 \qquad (1-1)$$

The condition (1-1) relates to a bow-shaped rotationally asymmetric image distortion in which a horizontal line, for example, is undesirably curved in a bow shape when imaged. Assuming that, as shown in the perspective view of FIG. 13(a) and FIG. 13(b), which is a projection of FIG. 13(a) onto the YZ-plane, DY denotes the difference between the value of the tangent in the YZ-plane of a line n' normal to a rotationally asymmetric surface A at a point where a principal ray at the maximum field angle in the direction X intersects the rotationally asymmetric surface A and the value of the tangent in the YZ-plane of a line n normal to the rotationally asymmetric surface A at a point where the axial principal ray intersects the rotationally asymmetric surface A, it is important to satisfy the condition (1-1). If DY is not larger than the lower limit of the condition (1-1), i.e. −0.1, it becomes impossible to correct an upwardly curved image distortion. If DY is not smaller than the upper limit, i.e. 0.1, an upwardly convex image distortion is over-corrected, resulting in a downwardly curved image distortion. In either case, the image is distorted in a bow shape, and it becomes more difficult to correct the image distortion by another surface.

It is more desirable to satisfy the following condition:

$$-0.03<DY<0.03 \quad (1\text{-}2)$$

It is still more desirable to satisfy the following condition:

$$-0.02<DY<0.005 \quad (1\text{-}3)$$

Further, it is preferable that the second surface as a first reflecting surface should satisfy the following condition:

$$-0.005<DY<0 \quad (1\text{-}4)$$

and that the first surface as a second reflecting surface should satisfy the following condition:

$$-0.020<DY<-0.005 \quad (1\text{-}5)$$

Regarding the above-defined DY, conditions relating to a bow-shaped image distortion corrected by a combination of the second surface as a first reflecting surface and the first surface as a second reflecting surface will be explained below. Assuming that a value obtained by subtracting DY at the second surface as a first reflecting surface from DY at the first surface as a second reflecting surface is defined as DY(S4−S3), it is important to satisfy the following condition:

$$-0.1<DY(S4\text{-}S3)<0.1 \quad (2\text{-}1)$$

If DY(S4−S3) is not larger than the lower limit of the condition (2-1), i.e. −0.1, a bow-shaped image distortion produced by the second surface cannot effectively be corrected by the first surface, and it remains undesirably. Moreover, it is even more difficult to correct the image distortion produced by the second surface by using another surface. If DY(S4−S3) is not smaller than the upper limit, i.e. 0.1, the bow-shaped image distortion produced by the second surface is over-corrected by the first surface, resulting in a reversed bow-shaped image distortion.

It is more desirable to satisfy the following condition:

$$-0.015<DY(S4\text{-}S3)<0 \quad (2\text{-}2)$$

Assuming that DX denotes the difference between the value of the tangent in the XZ-plane of a line normal to the at least one rotationally asymmetric surface at a position where a principal ray at the maximum field angle in the direction Y impinges on the surface and the value of the tangent in the XZ-plane of a line normal to the surface at a position where the axial principal ray impinges on the surface, it is desirable to satisfy the following condition:

$$-0.1<DX<0.1 \quad (3\text{-}1)$$

The condition (3-1) relates to an image distortion in which, for example, a vertical line passing through the center of the image field is undesirably curved in a bow shape when imaged. Assuming that, as shown in the perspective view of FIG. 14(a) and FIG. 14(b), which is a projection of FIG. 14(a) onto the XZ-plane, DX denotes the difference between the value of the tangent in the XZ-plane of a line n' normal to a rotationally asymmetric surface A at a point where a principal ray at the maximum field angle in the direction Y intersects the rotationally asymmetric surface A and the value of the tangent in the XZ-plane of a line n normal to the rotationally asymmetric surface A at a point where the axial principal ray intersects the rotationally asymmetric surface A, it is important to satisfy the condition (3-1). If DX is not larger than the lower limit of the condition (3-1), i.e. −0.1, an image distortion occurs which is convex in the positive direction of the X-axis (i.e. in the case of examples of the present invention, it is a direction in which a two-dimensional image display device is decentered in the X-axis direction). If DX is not smaller than the upper limit, i.e. 0.1, the image distortion is over-corrected, resulting in an image distortion which is convex in the negative direction of the X-axis, which is opposite to the above-described direction.

It is more desirable to satisfy the following condition:

$$-0.03<DX<0.03 \quad (3\text{-}2)$$

It is still more desirable to satisfy the following condition:

$$-0.010<DX<0.005 \quad (3\text{-}3)$$

Further, it is preferable that the second surface as a first reflecting surface should satisfy the following condition:

$$-0.002<DX<0.003 \quad (3\text{-}4)$$

and that the first surface as a second reflecting surface should satisfy the following condition:

$$-0.002<DX<0.004 \quad (3\text{-}5)$$

Regarding the above-defined DX, conditions relating to an image distortion in which a horizontal straight line is distorted in a bow shape, which is corrected by a combination of the second surface as a first reflecting surface and the first surface as a second reflecting surface, will be explained below. Assuming that a value obtained by subtracting DX at the second surface as a first reflecting surface from DX at the first surface as a second reflecting surface is defined as DX(S4−S3), it is important to satisfy the following condition:

$$-0.1<DX(S4\text{-}S3)<0.1 \quad (4\text{-}1)$$

If DX(S4−S3) is not larger than the lower limit of the condition (4-1), i.e. −0.1, a bow-shaped image distortion produced by the second surface cannot effectively be corrected by the first surface, and it remains undesirably. Moreover, it is even more difficult to correct the image distortion produced by the second surface by using another surface. If DX(S4−S3) is not smaller than the upper limit, i.e. 0.1, the bow-shaped image distortion produced by the second surface is over-corrected by the first surface, resulting in a reversed bow-shaped image distortion.

It is more desirable to satisfy the following condition:

$$-0.01<DX(S4\text{-}S3)<0.01 \quad (4\text{-}2)$$

Next, conditions relating to a trapezoidal image distortion will be explained. Assuming that, regarding each of the second surface as a first reflecting surface and the first surface as a second reflecting surface in the YZ-plane, Cxn (1/millimeter) denotes the difference in curvature in the direction X between a portion of each surface at which a principal ray at the maximum field angle in the positive direction of the Y-axis impinges on the surface and a portion thereof at which a principal ray at the maximum field angle in the negative direction of the Y-axis impinges on the surface, it is important to satisfy the following condition:

$$-0.1 < Cxn < 0.1 \quad (5\text{-}1)$$

If Cxn is not larger than the lower limit of the condition (5-1), i.e. −0.1, a trapezoidal distortion in which the base of a trapezoid becomes shorter in the negative direction of the Y-axis becomes excessively large and impossible to correct by another surface. If Cxn is not smaller than the upper limit, i.e. 0.1, a trapezoidal distortion in which the upside of a trapezoid becomes shorter in the positive direction of the Y-axis in reverse relation to the above occurs to a considerable extent and becomes difficult to correct by another surface. When Cxn is zero, a trapezoidal distortion produced by the decentered concave mirror cannot be reduced, but it is left uncorrected. In other words, it is important that Cxn should assume a value within the range defined by the condition (5-1), exclusive of zero, to cancel the image distortion with good balance with another surface.

It is more desirable to satisfy the following condition:

$$-0.01 < Cxn < 0.01 \quad (5\text{-}2)$$

It is still more desirable that the second surface should satisfy the following condition:

$$-0.001 < Cxn < 0.001 \quad (5\text{-}3)$$

and that the first surface should satisfy the following condition:

$$-0.009 < Cxn < -0.0025 \quad (5\text{-}4)$$

Next, other conditions relating to a trapezoidal image distortion will be explained. Assuming that, regarding each of the second surface as a first reflecting surface and the first surface as a second reflecting surface in the XZ-plane, Cyn (1/millimeter) denotes the difference in curvature in the direction Y between a portion of each surface at which a principal ray at the maximum field angle in the positive direction of the X-axis impinges on the surface and a portion thereof at which a principal ray at the maximum field angle in the negative direction of the X-axis impinges on the surface, it is important to satisfy the following condition:

$$-0.1 < Cyn < 0.1 \quad (6\text{-}1)$$

If Cyn is not larger than the lower limit of the condition (6-1), i.e. −0.1, a trapezoidal distortion in which the base of a trapezoid becomes shorter in the negative direction of the X-axis becomes excessively large and impossible to correct by another surface. If Cyn is not smaller than the upper limit, i.e. 0.1, a trapezoidal distortion in which the upside of a trapezoid becomes shorter in the positive direction of the X-axis in reverse relation to the above occurs to a considerable extent and becomes difficult to correct by another surface. When Cyn is zero, a trapezoidal distortion produced by the decentered concave mirror cannot be reduced, but it is left uncorrected. In other words, it is important that Cyn should assume a value within the range defined by the condition (6-1), exclusive of zero, to cancel the image distortion with good balance with another surface.

It is more desirable to satisfy the following condition:

$$-0.01 < Cyn < 0.01 \quad (6\text{-}2)$$

It is still more desirable that the second surface should satisfy the following condition:

$$-0.0075 < Cyn < -0.0025 \quad (6\text{-}3)$$

and that the first surface should satisfy the following condition:

$$-0.001 < Cyn < 0.001 \quad (6\text{-}4)$$

Next, the power of each rotationally asymmetric surface constituting the optical system according to the present invention will be explained. In ray tracing of a light ray which passes through a point that is a slight distance H (millimeters) away from the center of the entrance pupil of the optical system in the X-axis direction in parallel to an axial principal ray emanating from the center of an object point and passing through the center of the pupil, and which enters the optical system in parallel to the axial principal ray, a value obtained by dividing the distance H by the NA of the light ray exiting from the optical system (i.e. the value of the sine of an angle formed between the light ray and the axial principal ray) is defined as a focal length Fx (millimeter) in the direction X of the entire optical system. Further, in ray tracing of a light ray which passes through a point that is the distance H (millimeter) away from the pupil center in the Y-axis direction, and which enters the optical system in parallel to the axial principal ray, a value obtained by dividing the distance H by the NA of the light ray exiting from the optical system (i.e. the value of the sine of an angle formed between the light ray and the axial principal ray) is defined as a focal length Fy (millimeter) in the direction Y of the entire optical system. The refracting powers in the directions X and Y, which are the reciprocals of the focal lengths Fx and Fy in the directions X and Y, are defined as Px and Py (1/millimeter), respectively. The refracting powers in the directions X and Y at a position where the axial principal ray impinges on each of the second surface as a first reflecting surface and the first surface as a second reflecting surface are denoted by Pxn and Pyn (1/millimeter), respectively. On this assumption, it is desirable from the viewpoint of aberration correction to satisfy the following condition:

$$0.1 < |Pxn/Px| < 10 \quad (7\text{-}1)$$

If |Pxn/Px| is not smaller than the upper limit of the condition (7-1), i.e. 10, the power of the rotationally asymmetric surface becomes excessively strong in comparison to the power of the entire optical system. Consequently, the rotationally asymmetric surface has an excessively strong refracting power, and it becomes impossible to correct aberrations produced by the rotationally asymmetric surface by using another surface. If |Pxn/Px| is not larger than the lower limit, i.e. 0.1, the overall size of the optical system becomes undesirably large.

It is more desirable from the viewpoint of aberration correction to satisfy the following condition:

$$0.1 < |Pxn/Px| < 5 \quad (7\text{-}2)$$

By satisfying the condition (7-2), rotationally asymmetric aberration can be corrected even more favorably.

It is still more desirable from the viewpoint of aberration correction that the second surface should satisfy the following condition:

$$0.8 < |Pxn/Px| < 1.2 \quad (7\text{-}3)$$

and that the first surface should satisfy the following condition:

$$0.2 < |Pxn/Px| < 0.6 \quad (7\text{-}4)$$

By satisfying the conditions (7-3) and (7-4), rotationally asymmetric aberration can be corrected even more favorably.

Further, in an example where three reflections take place, it is preferable from the viewpoint of aberration correction that both the second and first surfaces should satisfy the following condition:

$$1.5<|Pxn/Px|<2.5 \tag{7-5}$$

If both the surfaces satisfy the condition (7-5), rotationally asymmetric aberration can be corrected even more favorably.

It is desirable from the viewpoint of aberration correction to satisfy the following condition:

$$0.001<|Pyn/Py|<10 \tag{8-1}$$

If |Pyn/Py| is not smaller than the upper limit of the condition (8-1), i.e. 10, the power of the rotationally asymmetric surface becomes excessively strong in comparison to the power of the entire optical system. Consequently, the rotationally asymmetric surface has an excessively strong refracting power, and it becomes impossible to correct aberrations produced by the rotationally asymmetric surface by using another surface. If |Pyn/Py| is not larger than the lower limit, i.e. 0.001, the overall size of the optical system becomes undesirably large.

It is more desirable from the viewpoint of aberration correction to satisfy the following condition:

$$0.001<|Pyn/Py|<5 \tag{8-2}$$

By satisfying the condition (8-2), rotationally asymmetric aberration can be corrected even more favorably.

It is still more desirable from the viewpoint of aberration correction that the second surface should satisfy the following condition:

$$0.6<|Pyn/Py|<1.1 \tag{8-3}$$

and that the first surface should satisfy the following condition:

$$0.008<|Pyn/Py|<0.3 \tag{8-4}$$

By satisfying the conditions (8-3) and (8-4), rotationally asymmetric aberration can be corrected even more favorably.

Assuming that Px and Py denote the powers in the directions X and Y, respectively, of the entire optical system, it is preferable from the viewpoint of aberration correction to satisfy the following condition:

$$0.1<Px/Py<10 \tag{9-1}$$

If Px/Py is not larger than the lower limit of the condition (9-1), i.e. 0.1, or not smaller than the upper limit, i.e. 10, the focal lengths in the directions X and Y of the entire optical system become excessively different from each other, and it becomes difficult to favorably correct the image distortion. Consequently, the image is undesirably distorted.

It is more desirable from the viewpoint of aberration correction to satisfy the following condition:

$$0.5<Px/Py<2 \tag{9-2}$$

By satisfying the condition (9-2), rotationally asymmetric aberration can be corrected even more favorably.

It is still more desirable from the viewpoint of aberration correction to satisfy the following condition:

$$0.8<Px/Py<1.2 \tag{9-3}$$

By satisfying the condition (9-3), rotationally asymmetric aberration can be corrected even more favorably.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1(a) and 1(b) are projection charts, in which FIG. 1(a) shows a projection of a decentered optical system according to Example 1 of the present invention onto the YZ-plane, and FIG. 1(b) shows a projection of the decentered optical system onto the XZ-plane.

FIG. 8 is an aberrational diagram showing image distortion in Example 5.

FIGS. 9(a) and 9(b) each show an arrangement in which a decentered optical system is used as an ocular optical system in a head-mounted image display apparatus.

FIG. 17 is a sectional view showing the arrangement of the electronic camera in FIG. 15.

FIG. 18 is a conceptual view of another electronic camera to which an optical system according to the present invention is applied.

FIG. 20 is a diagram showing an optical system of a pair of binoculars to which the present invention is applicable.

DESCRIPTION OF THE PREFERRED EMBODIMENTS

Figure 1A:
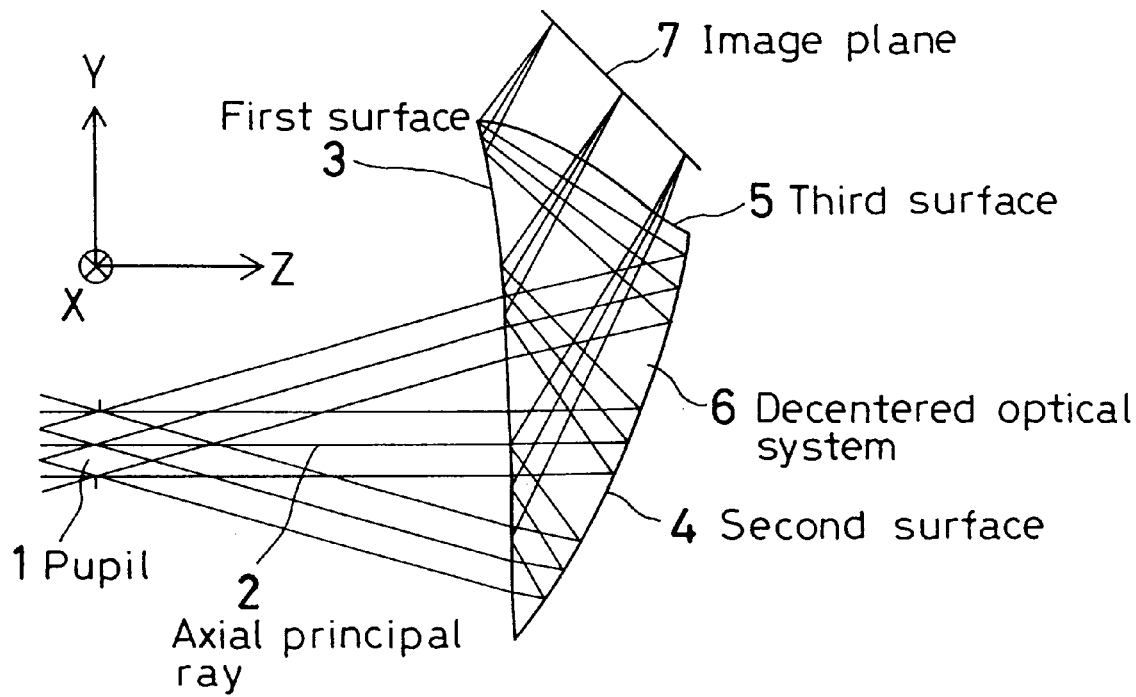
Figure 1B:
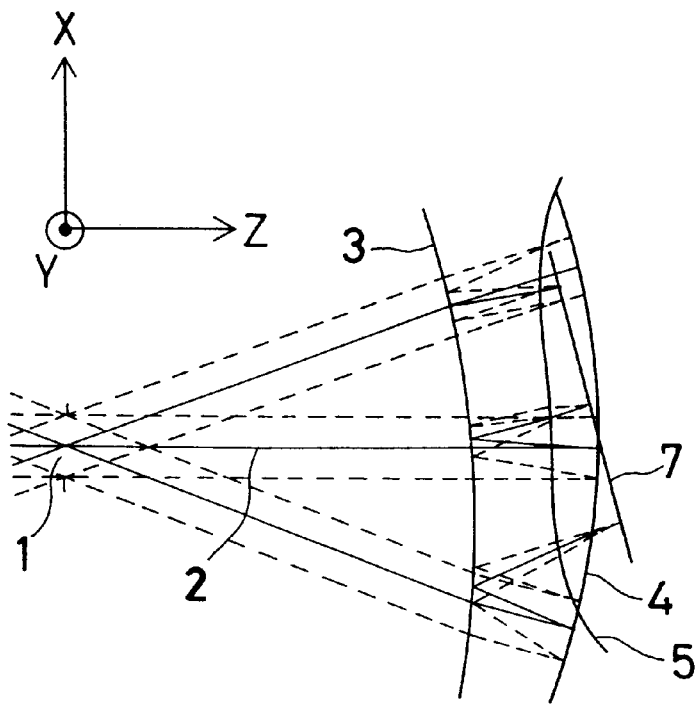
Figure 2A:
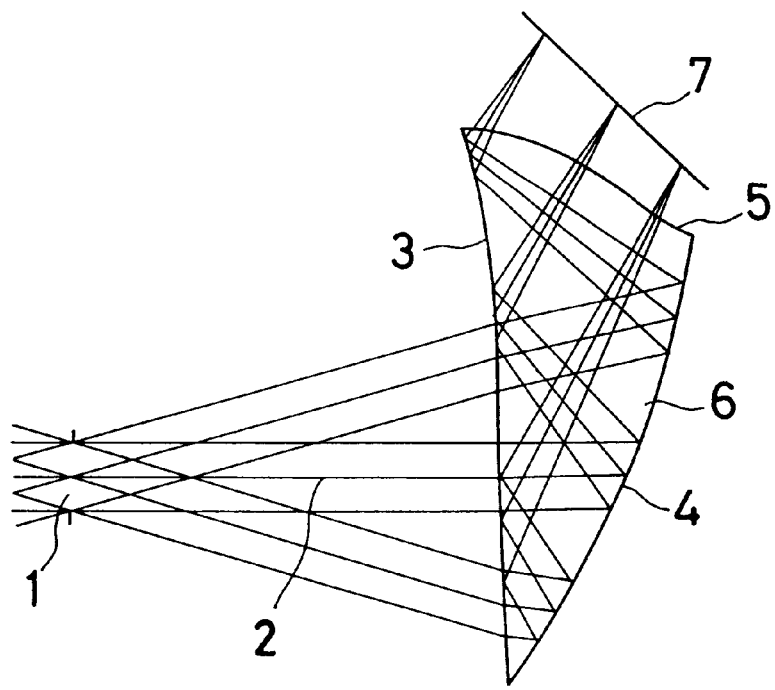
FIGS. 2(a) and 2(b) are projection charts similar to FIGS. 1(a) and 1(b), showing a decentered optical system according to Example 2 of the present invention.
Figure 2B:
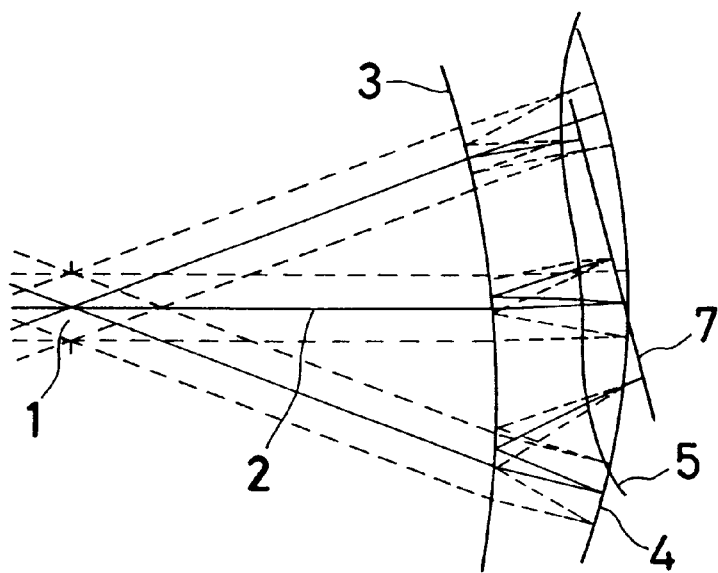
Figure 3A:
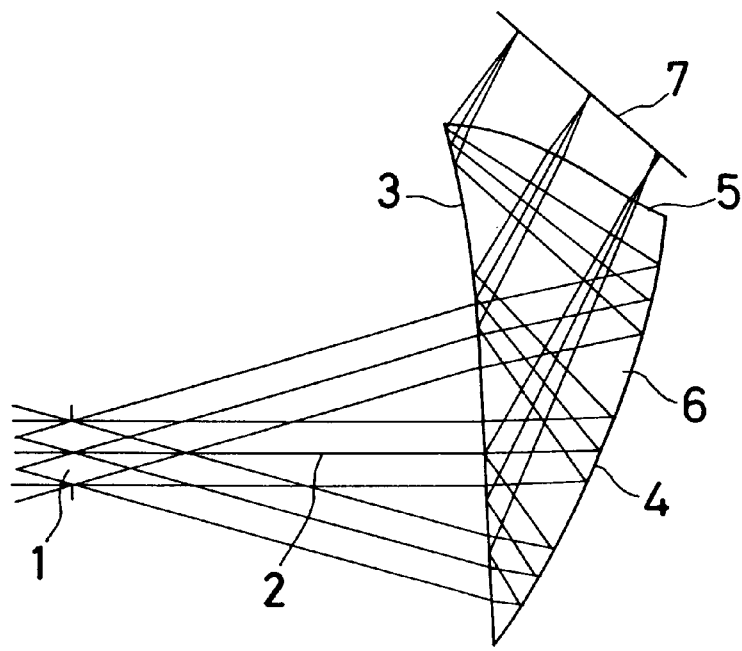
FIGS. 3(a) and 3(b) are projection charts similar to FIGS. 1(a) and 1(b), showing a decentered optical system according to Example 3 of the present invention.
Figure 3B:
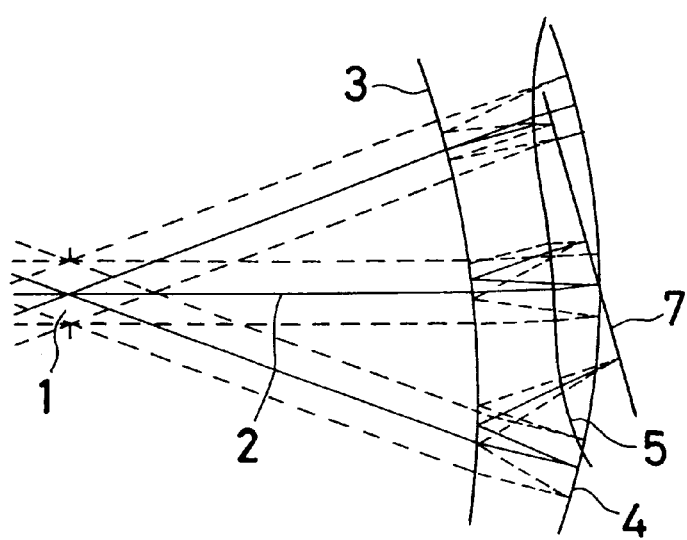
Figure 4:
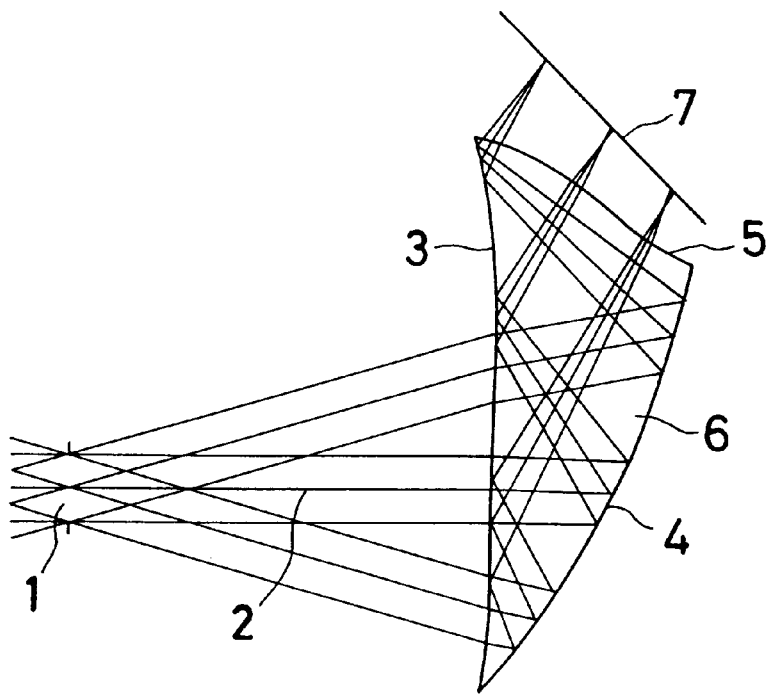
FIGS. 4(a) and 4(b) are projection charts similar to FIGS. 1(a) and 1(b), showing a decentered optical system according to Example 4 of the present invention.
Figure 4:
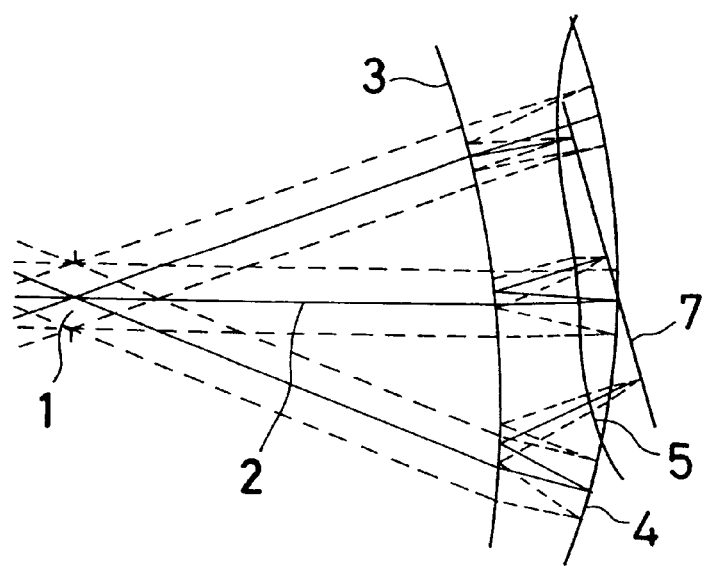
Figure 5A:
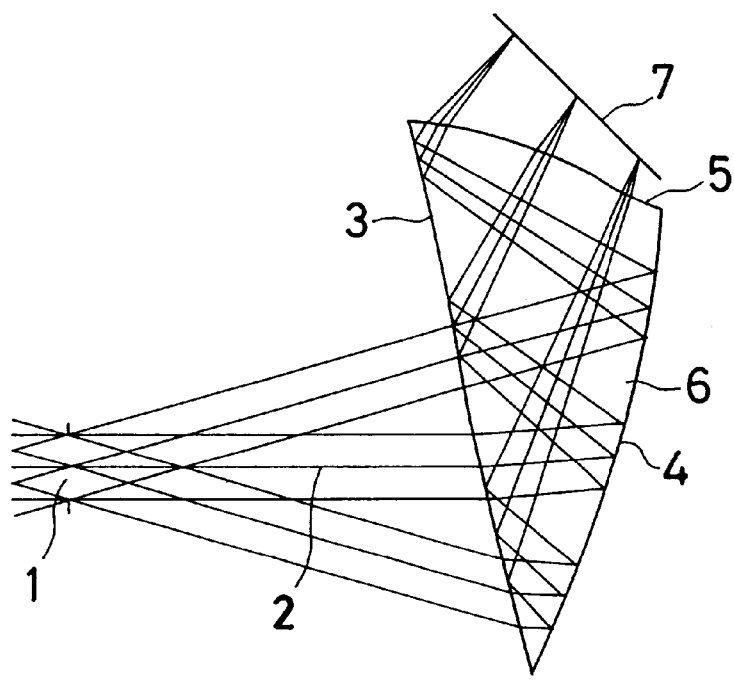
FIGS. 5(a) and 5(b) are projection charts similar to FIGS. 1(a) and 1(b), showing a decentered optical system according to Example 5 of the present invention.
Figure 5B:
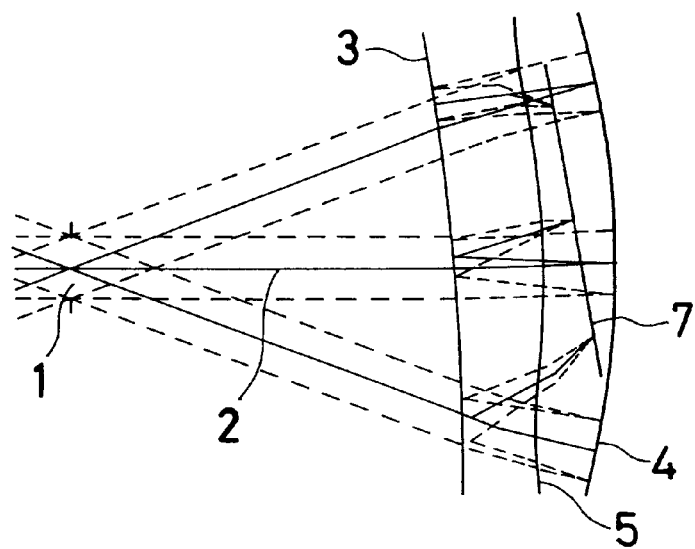

Examples 1 to 6 of the decentered optical system according to the present invention will be described below. Constituent parameters of each example (described later) are given as follows. As shown in FIG. 1(*a*), which is a projection onto the YZ-plane, and FIG. 1(*b*), which is a projection onto the XZ-plane, in the case of an image-forming optical system, a light ray emanating from the center of an object point and passing through the center of a pupil 1 to reach the center of an image 7 in the forward ray tracing is defined as an axial principal ray 2. In the case of an ocular optical system, a light ray passing through the center of the pupil 1 and reaching the center of the image or image display device 7 in the backward ray tracing is defined as an axial principal ray 2 (it should be noted that when the center of an image display device cannot specifically be defined, e.g. in the case of a trapezoidal image display device, the intersection of the diagonal lines is defined as a center thereof). The direction of the axial principal ray 2 from the pupil 1 to the first surface 3 of the decentered optical system 6 is defined as a positive direction of Z-axis. Assuming a line segment extending from the center of the image or image display device 7 perpendicularly to the Z-axis, an arbitrary direction in which the line segment tilts in the range of angle $\Delta Y$ that satisfies the above condition (0-1) in a plane perpendicular to the Z-axis is defined as a positive direction of Y-axis ($\Delta Y$ is an angle indicating the degree to which the line segment extending from the center of the image or image display device 7 perpendicularly to the Z-axis tilts from the Y-axis). An axis that constitutes an orthogonal coordinate system in combination with the Y- and Z-axes is defined as an X-axis. It should be noted that in the following examples the Y-axis is taken in the range defined by $$0° < \Delta Y < 8° \quad (0\text{-}3)$$

Each surface is given displacements in the X-, Y- and Z-axis directions of the vertex position of the surface from the center of the pupil 1, which is the origin of the optical system 6, and tilt angles of the center axis of the surface [the Z-axis in the above equation (a) with respect to a three-dimensional surface] with respect to the X-, Y- and Z-axes [$\alpha$, $\beta$ and $\gamma$(°), respectively]. In this case, positive $\alpha$ and $\beta$ mean counterclockwise rotation relative to the positive directions of the corresponding axes, and positive $\gamma$ means clockwise rotation relative to the positive direction of the Z-axis. In addition, the refractive index of each medium, and Abbe's number are given according to the conventional method.

The configuration of a three-dimensional surface is defined by the above equation (a), and the Z-axis of the defining equation is the axis of the rotationally asymmetric surface. When all the coefficients $C_m$ of the terms with odd-numbered powers of x in Eq.(a) are zero, a plane-symmetry three-dimensional surface which is symmetric with respect to the YZ-section is obtained. However, if finite values are entered into the coefficients $C_m$ of the terms with odd-numbered powers, a curved surface APS (Asymmetric Polynomial Surface) which is rotationally asymmetric and which has no plane of symmetry is obtained.

In the case of an ocular optical system, the constituent parameters (described later) are shown in the order of backward ray tracing. However, similar effects can be obtained in forward ray tracing as well. In the constituent parameters (described later), those terms concerning aspherical surfaces for which no data is shown are zero. The refractive index is expressed by the refractive index for the spectral d-line (wavelength: 587.56 nanometers). Lengths are given in millimeters.

Figure 6A:
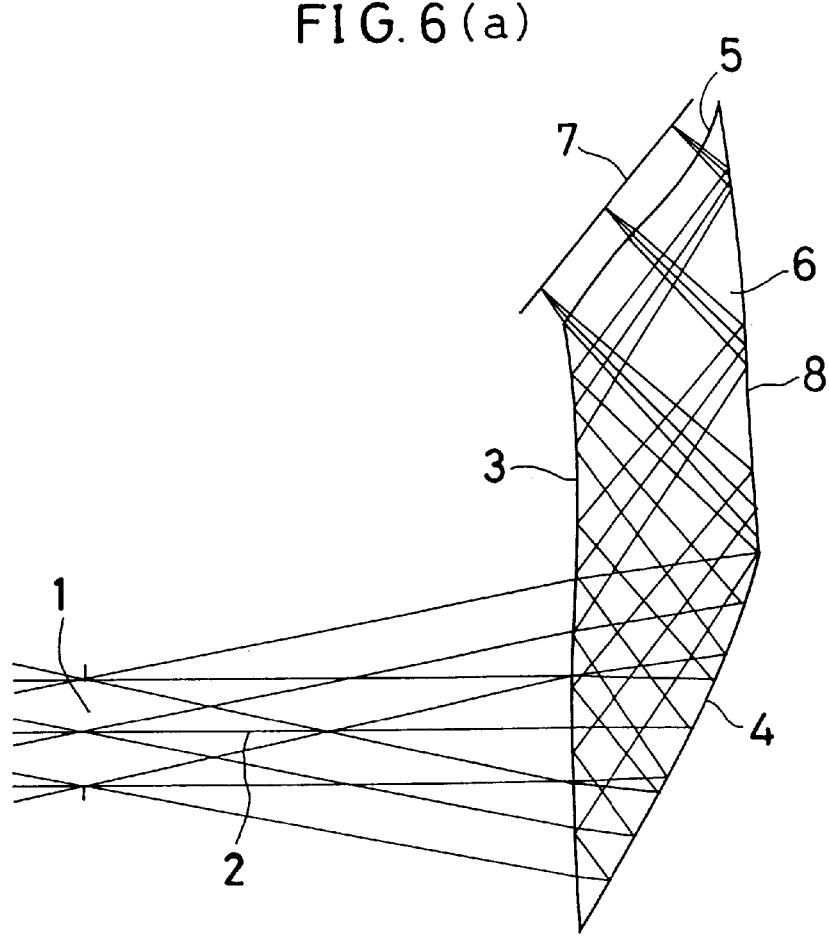
FIGS. 6(a) and 6(b) are projection charts similar to FIGS. 1(a) and 1(b), showing a decentered optical system according to Example 6 of the present invention.
Figure 6B:
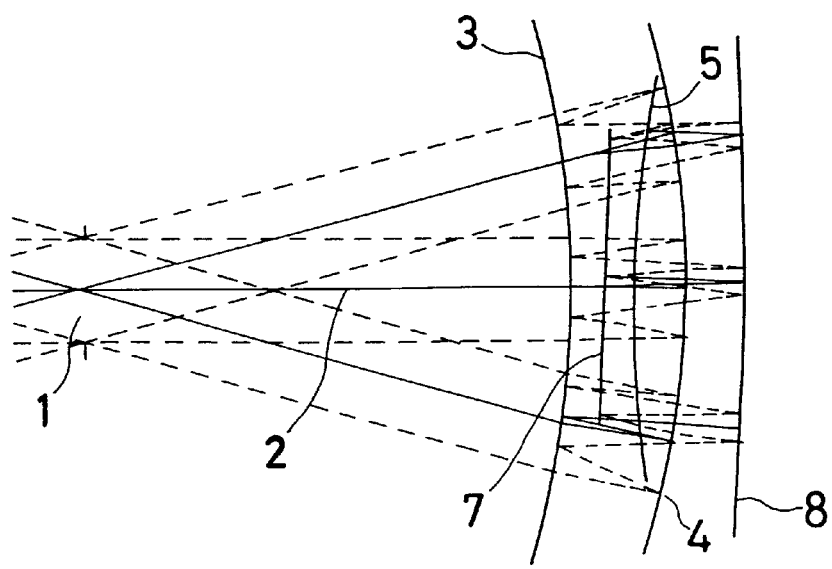

FIGS. 1(*a*) and 1(*b*) to FIGS. 6(*a*) and 6(*b*) are projection charts of decentered optical systems 6 according to Examples 1 to 6, respectively, in which FIGS. 1(*a*), 2(*a*), 3(*a*), 4(*a*), 5(*a*) and 6(*a*) each show a projection of the decentered optical system 6 onto the YZ-plane, and FIGS. 1(*b*), 2(*b*), 3(*b*), 4(*b*), 5(*b*) and 6(*b*) each show a projection of the decentered optical system 6 onto the XZ-plane. The decentered optical systems 6 in Examples 1 to 5 each include three surfaces, i.e. a first surface 3 serving as both a first transmitting surface and a second reflecting surface, a second surface 4 serving as a first reflecting surface, and a third surface 5 serving as a second transmitting surface. The space between the three surfaces 3 to 5 is filled with a transparent medium having a refractive index larger than 1. In the backward ray tracing, a bundle of light rays emitted from a hypothetic object point (not shown) travels along the optical axis 2 and passes through the pupil 1 of the optical system 6 to enter the optical system 6 through the first surface 3, which has both transmitting and reflecting actions. The incident rays are reflected toward the pupil 1 by the second surface 4, which is a reflecting surface located on a side remote from the pupil 1 and having only a reflecting action. The reflected rays are reflected by the first surface 3 so as to travel away from the pupil 1. The reflected rays pass through the third surface 5, which has only a transmitting action, and reach the image plane 7 where the rays form an image.

The decentered optical system 6 in Example 6 includes four surfaces, i.e. a first surface 3 serving as both a first transmitting surface and a second reflecting surface, a second surface 4 serving as a first reflecting surface, a fourth surface 8 serving as a third reflecting surface, and a third surface 5 serving as a second transmitting surface. The space between the four surfaces 3, 4, 5 and 8 is filled with a transparent medium having a refractive index larger than 1. In the backward ray tracing, a bundle of light rays emitted from a hypothetic object point (not shown) travels along the optical axis 2 and passes through the pupil 1 of the optical system 6 to enter the optical system 6 through the first surface 3 having both transmitting and reflecting actions. The incident rays are reflected toward the pupil 1 by the second surface 4, which is a reflecting surface located on a side remote from the pupil 1 and having only a reflecting action. The reflected rays are reflected by the first surface 3 as to travel away from the pupil 1. Then, the reflected rays are reflected toward the pupil 1 by the fourth surface 8. The reflected rays pass through the third surface 5, which has only a transmitting action, and reach the image plane 7 where the rays form an image.

In Example 1, the second surface 4 and the third surface 5 are plane-symmetry three-dimensional surfaces. The first surface 3 is formed into an APS which is rotationally asymmetric and has no plane of symmetry by introducing the term xy and the term $xy^2$. In Example 2, in addition to the surface arrangement in Example, 1, the term $xy^2$ is introduced into the second surface 4. Thus, both the first surface 3 and the second surface 4 are formed into APS's which are rotationally asymmetric and have no plane of symmetry. In Examples 3 to 5, in addition to the surface arrangement in Example 2, the term xy is introduced into the second surface 4. Thus, both the first surface 3 and the second surface 4 are formed into APS's which are rotationally asymmetric and have no plane of symmetry. In Example 6, the first surface 3, the third surface 5 and the fourth surface 8 are plane-symmetry three-dimensional surfaces, and the second surface 4 is an APS which is rotationally asymmetric and has no plane of symmetry.

It should be noted that the optical systems in Examples 1 to 5 are arranged such that when the hypothetic object point is at −1000 millimeters, the entrance pupil diameter is 4 millimeters, the horizontal half field angle is 20° and the vertical half field angle is 15.27°, the image plane is decentered by 3 millimeters in the direction X, and an image is formed in an area of 14.55 millimeters by 11.2 millimeters. The optical system in Example 6 is arranged such that when the hypothetic object point is at −500 millimeters, the entrance pupil diameter is 8 millimeters, the horizontal half field angle is 15° and the vertical half field angle is 11.36°, the image plane is decentered by 1 millimeter in the direction X, and an image is formed in an area of 14.55 millimeters by 11.2 millimeters. In Examples 1 to 6, a two-dimensional image display device is disposed in the image-formation plane of the optical system, and an observer's eyeball is placed in the vicinity of the position of the entrance pupil to observe an enlarged view of the two-dimensional image display device.

The constituent parameters of the above-described Examples 1 to 6 are as follows:

EXAMPLE 1

| Surface No. | Radius of curvature | Surface separation | Displacement and tilt | Refractive index | Abbe's No. |
|---|---|---|---|---|---|
| 1 | ∞(pupil) | | | | |
| 2 | Three-dimensional surface(1) | | (1) | 1.4922 | 57.5 |
| 3 | Three-dimensional surface(2) | | (2) | 1.4922 | 57.5 |
| 4 | Three-dimensional surface(1) | | (1) | 1.4922 | 57.5 |
| 5 | Three-dimensional surface(3) | | (3) | | |
| 6 | ∞(image plane) | | (4) | | |

Three-dimensional surface(1)

| | | | | | |
|---|---|---|---|---|---|
| $C_5$ | $-4.5570 \times 10^{-3}$ | $C_6$ | $6.6524 \times 10^{-4}$ | $C_7$ | $-8.0638 \times 10^{-3}$ |
| $C_8$ | $-2.0209 \times 10^{-4}$ | $C_9$ | $3.1672 \times 10^{-5}$ | $C_{10}$ | $-1.1776 \times 10^{-4}$ |
| $C_{12}$ | $-3.2973 \times 10^{-6}$ | $C_{14}$ | $1.8873 \times 10^{-6}$ | $C_{16}$ | $7.8671 \times 10^{-7}$ |

Three-dimensional surface(2)

| | | | | | |
|---|---|---|---|---|---|
| $C_5$ | $-9.6338 \times 10^{-3}$ | $C_7$ | $-1.1841 \times 10^{-2}$ | $C_8$ | $-4.1028 \times 10^{-5}$ |
| $C_{10}$ | $2.7469 \times 10^{-5}$ | $C_{12}$ | $8.6700 \times 10^{-7}$ | $C_{14}$ | $-6.3534 \times 10^{-7}$ |
| $C_{16}$ | $-2.7693 \times 10^{-6}$ | $C_{17}$ | $-1.7325 \times 10^{-8}$ | $C_{19}$ | $-2.4986 \times 10^{-7}$ |
| $C_{21}$ | $-8.9541 \times 10^{-8}$ | | | | |

Three-dimensional surface(3)

| | | | | | |
|---|---|---|---|---|---|
| $C_5$ | $-2.7683 \times 10^{-2}$ | $C_7$ | $-1.2496 \times 10^{-2}$ | $C_8$ | $-1.2021 \times 10^{-3}$ |
| $C_{10}$ | $7.6830 \times 10^{-4}$ | $C_{12}$ | $1.3316 \times 10^{-4}$ | $C_{14}$ | $2.9297 \times 10^{-4}$ |
| $C_{16}$ | $1.2510 \times 10^{-4}$ | $C_{17}$ | $-2.3391 \times 10^{-6}$ | $C_{19}$ | $-3.0351 \times 10^{-6}$ |
| $C_{21}$ | $1.2885 \times 10^{-6}$ | | | | |

Displacement and tilt(1)

| | | | | | |
|---|---|---|---|---|---|
| x | 0.000 | y | 9.399 | z | 26.516 |
| α | 4.55 | β | −5.45 | γ | 0.00 |

Displacement and tilt(2)

| | | | | | |
|---|---|---|---|---|---|
| x | 0.254 | y | 0.092 | z | 34.772 |
| α | −23.75 | β | 0.00 | γ | 0.00 |

Displacement and tilt(3)

| | | | | | |
|---|---|---|---|---|---|
| x | 2.245 | y | 17.728 | z | 31.623 |
| α | 58.67 | β | −8.92 | γ | 0.00 |

Displacement and tilt(4)

| | | | | | |
|---|---|---|---|---|---|
| x | 3.000 | y | 21.643 | z | 34.077 |
| α | 47.25 | β | −13.83 | γ | 7.91 |

EXAMPLE 2

| Surface No. | Radius of curvature | Surface separation | Displacement and tilt | Refractive index | Abbe's No. |
|---|---|---|---|---|---|
| 1 | ∞(pupil) | | | | |
| 2 | Three-dimensional surface(1) | | (1) | 1.4922 | 57.5 |
| 3 | Three-dimensional surface(2) | | (2) | 1.4922 | 57.5 |
| 4 | Three-dimensional surface(1) | | (1) | 1.4922 | 57.5 |
| 5 | Three-dimensional surface(3) | | (3) | | |
| 6 | ∞(image plane) | | (4) | | |

Three-dimensional surface(1)

| | | | | | |
|---|---|---|---|---|---|
| $C_5$ | $-4.5570 \times 10^{-3}$ | $C_6$ | $6.3213 \times 10^{-4}$ | $C_7$ | $-8.0638 \times 10^{-3}$ |
| $C_8$ | $-2.0209 \times 10^{-4}$ | $C_9$ | $7.1237 \times 10^{-5}$ | $C_{10}$ | $-1.1776 \times 10^{-4}$ |
| $C_{12}$ | $-3.2973 \times 10^{-6}$ | $C_{14}$ | $1.8873 \times 10^{-6}$ | $C_{16}$ | $7.8671 \times 10^{-7}$ |

Three-dimensional surface(2)

| | | | | | |
|---|---|---|---|---|---|
| $C_5$ | $-9.6338 \times 10^{-3}$ | $C_7$ | $-1.1841 \times 10^{-2}$ | $C_8$ | $-4.1028 \times 10^{-5}$ |
| $C_9$ | $5.4265 \times 10^{-5}$ | $C_{10}$ | $2.7469 \times 10^{-5}$ | $C_{12}$ | $8.6700 \times 10^{-7}$ |
| $C_{14}$ | $-6.3534 \times 10^{-7}$ | $C_{16}$ | $-2.7693 \times 10^{-6}$ | $C_{17}$ | $-1.7325 \times 10^{-8}$ |
| $C_{19}$ | $-2.4986 \times 10^{-7}$ | $C_{21}$ | $-8.9541 \times 10^{-8}$ | | |

Three-dimensional surface(3)

| | | | | | |
|---|---|---|---|---|---|
| $C_5$ | $-2.7683 \times 10^{-2}$ | $C_7$ | $-1.2496 \times 10^{-2}$ | $C_8$ | $-1.2021 \times 10^{-3}$ |
| $C_{10}$ | $7.6830 \times 10^{-4}$ | $C_{12}$ | $1.3316 \times 10^{-4}$ | $C_{14}$ | $2.9297 \times 10^{-4}$ |
| $C_{16}$ | $1.2510 \times 10^{-4}$ | $C_{17}$ | $-2.3391 \times 10^{-6}$ | $C_{19}$ | $-3.0351 \times 10^{-6}$ |
| $C_{21}$ | $1.2885 \times 10^{-6}$ | | | | |

Displacement and tilt(1)

| | | | | | |
|---|---|---|---|---|---|
| x | 0.000 | y | 9.668 | z | 26.467 |
| α | 5.37 | β | −5.62 | γ | 0.00 |

Displacement and tilt(2)

| | | | | | |
|---|---|---|---|---|---|
| x | 0.261 | y | 0.132 | z | 34.989 |
| α | −23.51 | β | 0.00 | γ | 0.00 |

Displacement and tilt(3)

| | | | | | |
|---|---|---|---|---|---|
| x | 2.432 | y | 18.894 | z | 31.820 |
| α | 61.18 | β | −12.08 | γ | 0.00 |

Displacement and tilt(4)

| | | | | | |
|---|---|---|---|---|---|
| x | 3.000 | y | 22.476 | z | 33.966 |
| α | 49.60 | β | −14.19 | γ | 8.67 |

EXAMPLE 3

| Surface No. | Radius of curvature | Surface separation | Displacement and tilt | Refractive index | Abbe's No. |
|---|---|---|---|---|---|
| 1 | ∞(pupil) | | | | |
| 2 | Three-dimensional surface(1) | | (1) | 1.4922 | 57.5 |
| 3 | Three-dimensional surface(2) | | (2) | 1.4922 | 57.5 |
| 4 | Three-dimensional surface(1) | | (1) | 1.4922 | 57.5 |
| 5 | Three-dimensional surface(3) | | (3) | | |
| 6 | ∞(image plane) | | (4) | | |

Three-dimensional surface(1)

| | | | | | |
|---|---|---|---|---|---|
| $C_5$ | $-4.5570 \times 10^{-3}$ | $C_6$ | $-1.6137 \times 10^{-3}$ | $C_7$ | $-8.0638 \times 10^{-3}$ |
| $C_8$ | $-2.0209 \times 10^{-4}$ | $C_9$ | $4.1827 \times 10^{-5}$ | $C_{10}$ | $-1.1776 \times 10^{-4}$ |
| $C_{12}$ | $-3.2973 \times 10^{-6}$ | $C_{14}$ | $1.8873 \times 10^{-6}$ | $C_{16}$ | $7.8671 \times 10^{-7}$ |

Three-dimensional surface(2)

| | | | | | |
|---|---|---|---|---|---|
| $C_5$ | $-9.6338 \times 10^{-3}$ | $C_6$ | $-1.2355 \times 10^{-3}$ | $C_7$ | $-1.1841 \times 10-2$ |
| $C_8$ | $-4.1028 \times 10^{-5}$ | $C_9$ | $5.9240 \times 10^{-5}$ | $C_{10}$ | $2.7469 \times 10^{-5}$ |
| $C_{12}$ | $8.6700 \times 10^{-7}$ | $C_{14}$ | $-6.3534 \times 10^{-7}$ | $C_{16}$ | $-2.7693 \times 10^{-6}$ |
| $C_{17}$ | $-1.7325 \times 10^{-8}$ | $C_{19}$ | $-2.4986 \times 10^{-7}$ | $C_{21}$ | $-8.9541 \times 10^{-8}$ |

Three-dimensional surface(3)

| | | | | | |
|---|---|---|---|---|---|
| $C_5$ | $-2.7683 \times 10^{-2}$ | $C_7$ | $-1.2496 \times 10^{-2}$ | $C_8$ | $-1.2021 \times 10^{-3}$ |
| $C_{10}$ | $7.6830 \times 10^{-4}$ | $C_{12}$ | $1.3316 \times 10^{-4}$ | $C_{14}$ | $2.9297 \times 10^{-4}$ |

-continued

|     |                          |          |                          |          |                          |
|-----|--------------------------|----------|--------------------------|----------|--------------------------|
| $C_{16}$ | $1.2510 \times 10^{-4}$ | $C_{17}$ | $-2.3391 \times 10^{-6}$ | $C_{19}$ | $-3.0351 \times 10^{-6}$ |
| $C_{21}$ | $1.2885 \times 10^{-6}$ |          |                          |          |                          |

Displacement and tilt(1)

| x | 0.000 | y | 9.483  | z | 26.375 |
|---|-------|---|--------|---|--------|
| α | 5.37  | β | -6.16  | γ | 0.00   |

Displacement and tilt(2)

| x | 0.227  | y | 0.129 | z | 34.737 |
|---|--------|---|-------|---|--------|
| α | -23.50 | β | 0.00  | γ | 0.00   |

Displacement and tilt(3)

| x | 2.389 | y | 18.635 | z | 31.617 |
|---|-------|---|--------|---|--------|
| α | 63.86 | β | -12.37 | γ | 0.00   |

Displacement and tilt(4)

| x | 3.000 | y | 22.214 | z | 33.857 |
|---|-------|---|--------|---|--------|
| α | 52.07 | β | -14.55 | γ | 9.31   |

EXAMPLE 4

| Surface No. | Radius of curvature | Surface separation | Displacement and tilt | Refractive index | Abbe's No. |
|---|---|---|---|---|---|
| 1 | ∞(pupil) |   |   |   |   |
| 2 | Three-dimensional surface(1) |   | (1) | 1.4922 | 57.5 |
| 3 | Three-dimensional surface(2) |   | (2) | 1.4922 | 57.5 |
| 4 | Three-dimensional surface(1) |   | (1) | 1.4922 | 57.5 |
| 5 | Three-dimensional surface(3) |   | (3) |   |   |
| 6 | ∞(image plane) |   | (4) |   |   |

Three-dimensional surface(1)

| $C_5$    | $-4.5570 \times 10^{-3}$ | $C_6$    | $-1.2695 \times 10^{-3}$ | $C_7$    | $-8.0638 \times 10^{-3}$ |
|----------|--------------------------|----------|--------------------------|----------|--------------------------|
| $C_8$    | $-2.0209 \times 10^{-4}$ | $C_9$    | $3.2965 \times 10^{-5}$  | $C_{10}$ | $-1.1776 \times 10^{-4}$ |
| $C_{12}$ | $-3.2973 \times 10^{-6}$ | $C_{14}$ | $1.8873 \times 10^{-6}$  | $C_{16}$ | $7.8671 \times 10^{-7}$  |

Three-dimensional surface(2)

| $C_5$    | $-9.6338 \times 10^{-3}$ | $C_6$    | $-9.3670 \times 10^{-4}$ | $C_7$    | $-1.1841 \times 10^{-2}$ |
|----------|--------------------------|----------|--------------------------|----------|--------------------------|
| $C_8$    | $-4.1028 \times 10^{-5}$ | $C_9$    | $4.0911 \times 10^{-5}$  | $C_{10}$ | $2.7469 \times 10^{-5}$  |
| $C_{12}$ | $8.6700 \times 10^{-7}$  | $C_{14}$ | $-6.3534 \times 10^{-7}$ | $C_{16}$ | $-2.7693 \times 10^{-6}$ |
| $C_{17}$ | $-1.7325 \times 10^{-8}$ | $C_{19}$ | $-2.4986 \times 10^{-7}$ | $C_{21}$ | $-8.9541 \times 10^{-8}$ |

Three-dimensional surface(3)

| $C_5$    | $-2.7683 \times 10^{-2}$ | $C_7$    | $-1.2496 \times 10^{-2}$ | $C_8$    | $-1.2021 \times 10^{-3}$ |
|----------|--------------------------|----------|--------------------------|----------|--------------------------|
| $C_{10}$ | $7.6830 \times 10^{-4}$  | $C_{12}$ | $1.3316 \times 10^{-4}$  | $C_{14}$ | $2.9297 \times 10^{-4}$  |
| $C_{16}$ | $1.2510 \times 10^{-4}$  | $C_{17}$ | $-2.3391 \times 10^{-6}$ | $C_{19}$ | $-3.0351 \times 10^{-6}$ |
| $C_{21}$ | $1.2885 \times 10^{-6}$  |          |                          |          |                          |

Displacement and tilt(1)

| x | 0.000 | y | 10.596 | z | 27.055 |
|---|-------|---|--------|---|--------|
| α | 1.40  | β | -6.70  | γ | 0.00   |

Displacement and tilt(2)

| x | 0.259  | y | -0.051 | z | 34.828 |
|---|--------|---|--------|---|--------|
| α | -26.97 | β | 0.00   | γ | 0.00   |

Displacement and tilt(3)

| x | 2.465 | y | 18.896 | z | 32.203 |
|---|-------|---|--------|---|--------|
| α | 56.45 | β | -14.82 | γ | 0.00   |

Displacement and tilt(4)

| x | 3.000 | y | 22.168 | z | 34.215 |
|---|-------|---|--------|---|--------|
| α | 48.13 | β | -16.48 | γ | 9.63   |

EXAMPLE 5

| Surface No. | Radius of curvature | Surface separation | Displacement and tilt | Refractive index | Abbe's No. |
|---|---|---|---|---|---|
| 1 | ∞(pupil) | | | | |
| 2 | Three-dimensional surface(1) | | (1) | 1.4922 | 57.5 |
| 3 | Three-dimensional surface(2) | | (2) | 1.4922 | 57.5 |
| 4 | Three-dimensional surface(1) | | (1) | 1.4922 | 57.5 |
| 5 | Three-dimensional surface(3) | | (3) | | |
| 6 | ∞(image plane) | | (4) | | |

Three-dimensional surface(1)

| | | | | | |
|---|---|---|---|---|---|
| $C_5$ | $-1.1784 \times 10^{-4}$ | $C_6$ | $2.2015 \times 10^{-5}$ | $C_7$ | $-3.0016 \times 10^{-3}$ |
| $C_8$ | $-8.6362 \times 10^{-5}$ | $C_9$ | $1.7223 \times 10^{-5}$ | $C_{10}$ | $-8.8981 \times 10^{-5}$ |
| $C_{12}$ | $-1.3585 \times 10^{-6}$ | $C_{14}$ | $-7.2143 \times 10^{-7}$ | $C_{16}$ | $1.2123 \times 10^{-6}$ |

Three-dimensional surface(2)

| | | | | | |
|---|---|---|---|---|---|
| $C_5$ | $-6.8555 \times 10^{-3}$ | $C_6$ | $2.7529 \times 10^{-5}$ | $C_7$ | $-9.2050 \times 10^{-3}$ |
| $C_8$ | $-5.4399 \times 10^{-5}$ | $C_9$ | $-4.3731 \times 10^{-7}$ | $C_{10}$ | $-4.3036 \times 10^{-6}$ |
| $C_{12}$ | $9.6628 \times 10^{-7}$ | $C_{14}$ | $3.5956 \times 10^{-7}$ | $C_{16}$ | $-5.4535 \times 10^{-8}$ |
| $C_{17}$ | $1.3530 \times 10^{-10}$ | $C_{19}$ | $-4.0067 \times 10^{-8}$ | $C_{21}$ | $-1.8694 \times 10^{-8}$ |

Three-dimensional surface(3)

| | | | | | |
|---|---|---|---|---|---|
| $C_5$ | $-2.1993 \times 10^{-2}$ | $C_7$ | $-2.6478 \times 10^{-2}$ | $C_8$ | $-4.0384 \times 10^{-4}$ |
| $C_{10}$ | $9.5874 \times 10^{-4}$ | $C_{12}$ | $1.2965 \times 10^{-4}$ | $C_{14}$ | $1.4348 \times 10^{-4}$ |
| $C_{16}$ | $6.0979 \times 10^{-5}$ | $C_{17}$ | $-3.7748 \times 10^{-6}$ | $C_{19}$ | $-9.0564 \times 10^{-6}$ |
| $C_{21}$ | $-6.5364 \times 10^{-6}$ | | | | |

Displacement and tilt(1)

| | | | | | |
|---|---|---|---|---|---|
| x | 0.000 | y | 8.662 | z | 25.135 |
| α | 11.87 | β | −4.92 | γ | 0.00 |

Displacement and tilt(2)

| | | | | | |
|---|---|---|---|---|---|
| x | 0.244 | y | 0.631 | z | 35.547 |
| α | −16.62 | β | 0.00 | γ | 0.00 |

Displacement and tilt(3)

| | | | | | |
|---|---|---|---|---|---|
| x | 2.405 | y | 19.460 | z | 30.854 |
| α | 68.20 | β | −8.04 | γ | 0.00 |

Displacement and tilt(4)

| | | | | | |
|---|---|---|---|---|---|
| x | 3.000 | y | 22.914 | z | 32.949 |
| α | 47.74 | β | −9.72 | γ | 5.56 |

EXAMPLE 6

| Surface No. | Radius of curvature | Surface separation | Displacement and tilt | Refractive index | Abbe's No. |
|---|---|---|---|---|---|
| 1 | ∞(pupil) | | | | |
| 2 | Three-dimensional surface(1) | | (1) | 1.4922 | 57.5 |
| 3 | Three-dimensional surface(2) | | (2) | 1.4922 | 57.5 |
| 4 | Three-dimensional surface(1) | | (1) | 1.4922 | 57.5 |
| 5 | Three-dimensional surface(3) | | (3) | 1.4922 | 57.5 |
| 6 | Three-dimensional surface(4) | | (4) | | |
| 7 | ∞(image plane) | | (5) | | |

Three-dimensional surface(1)

| | | | | | |
|---|---|---|---|---|---|
| $C_5$ | $-5.4964 \times 10^{-4}$ | $C_7$ | $-8.3676 \times 10^{-3}$ | $C_8$ | $-5.9486 \times 10^{-5}$ |
| $C_{10}$ | $-1.6196 \times 10^{-4}$ | $C_{12}$ | $-1.6676 \times 10^{-7}$ | $C_{14}$ | $-3.9762 \times 10^{-7}$ |
| $C_{16}$ | $2.6066 \times 10^{-6}$ | $C_{17}$ | $-6.5700 \times 10^{-9}$ | $C_{19}$ | $3.0916 \times 10^{-8}$ |
| $C_{21}$ | $1.1391 \times 10^{-7}$ | | | | |

Three-dimensional surface(2)

| | | | | | |
|---|---|---|---|---|---|
| $C_5$ | $-4.5097 \times 10^{-3}$ | $C_6$ | $-2.8677 \times 10^{-5}$ | $C_7$ | $-8.5725 \times 10^{-3}$ |
| $C_8$ | $-5.4881 \times 10^{-5}$ | $C_9$ | $9.3476 \times 10^{-8}$ | $C_{10}$ | $-2.8271 \times 10^{-5}$ |
| $C_{12}$ | $1.3855 \times 10^{-6}$ | $C_{14}$ | $9.3642 \times 10^{-10}$ | $C_{16}$ | $-1.4914 \times 10^{-8}$ |
| $C_{17}$ | $-4.2012 \times 10^{-8}$ | $C_{19}$ | $-1.8261 \times 10^{-8}$ | $C_{21}$ | $-6.9906 \times 10^{-9}$ |

Three-dimensional surface(3)

| | | | | | |
|---|---|---|---|---|---|
| $C_5$ | $-3.6420 \times 10^{-4}$ | $C_7$ | $-3.0804 \times 10^{-3}$ | $C_8$ | $-5.2170 \times 10^{-5}$ |
| $C_{10}$ | $-1.4460 \times 10^{-4}$ | $C_{12}$ | $-2.3208 \times 10^{-6}$ | $C_{14}$ | $2.1145 \times 10^{-6}$ |

-continued

| | | | | | |
|---|---|---|---|---|---|
| $C_{16}$ | $3.3162 \times 10^{-6}$ | $C_{17}$ | $-6.5510 \times 10^{-8}$ | $C_{19}$ | $1.5256 \times 10^{-7}$ |
| $C_{21}$ | $2.8723 \times 10^{-7}$ | | | | |

Three-dimensional surface(4)

| | | | | | |
|---|---|---|---|---|---|
| $C_5$ | $3.3939 \times 10^{-3}$ | $C_7$ | $8.3775 \times 10^{-3}$ | $C_8$ | $-9.2996 \times 10^{-4}$ |
| $C_{10}$ | $1.1995 \times 10^{-6}$ | $C_{12}$ | $-5.8621 \times 10^{-5}$ | $C_{14}$ | $1.5381 \times 10^{-5}$ |
| $C_{16}$ | $-2.3878 \times 10^{-6}$ | $C_{17}$ | $-1.4311 \times 10^{-7}$ | $C_{19}$ | $-3.2128 \times 10^{-8}$ |
| $C_{21}$ | $3.2390 \times 10^{-10}$ | | | | |

Displacement and tilt(1)

| | | | | | |
|---|---|---|---|---|---|
| x | 0.267 | y | 8.739 | z | 38.368 |
| α | −0.45 | β | −0.10 | γ | 0.00 |

Displacement and tilt(2)

| | | | | | |
|---|---|---|---|---|---|
| x | 0.000 | y | 0.000 | z | 47.215 |
| α | −26.38 | β | 0.53 | γ | 0.00 |

Displacement and tilt(3)

| | | | | | |
|---|---|---|---|---|---|
| x | 0.624 | y | 29.011 | z | 51.551 |
| α | 3.97 | β | 0.45 | γ | 0.00 |

Displacement and tilt(4)

| | | | | | |
|---|---|---|---|---|---|
| x | 0.950 | y | 37.341 | z | 43.122 |
| α | −42.91 | β | 2.48 | γ | 0.00 |

Displacement and tilt(5)

| | | | | | |
|---|---|---|---|---|---|
| x | 1.000 | y | 39.251 | z | 40.804 |
| α | −39.32 | β | 1.87 | γ | 1.11 |

Figure 7:
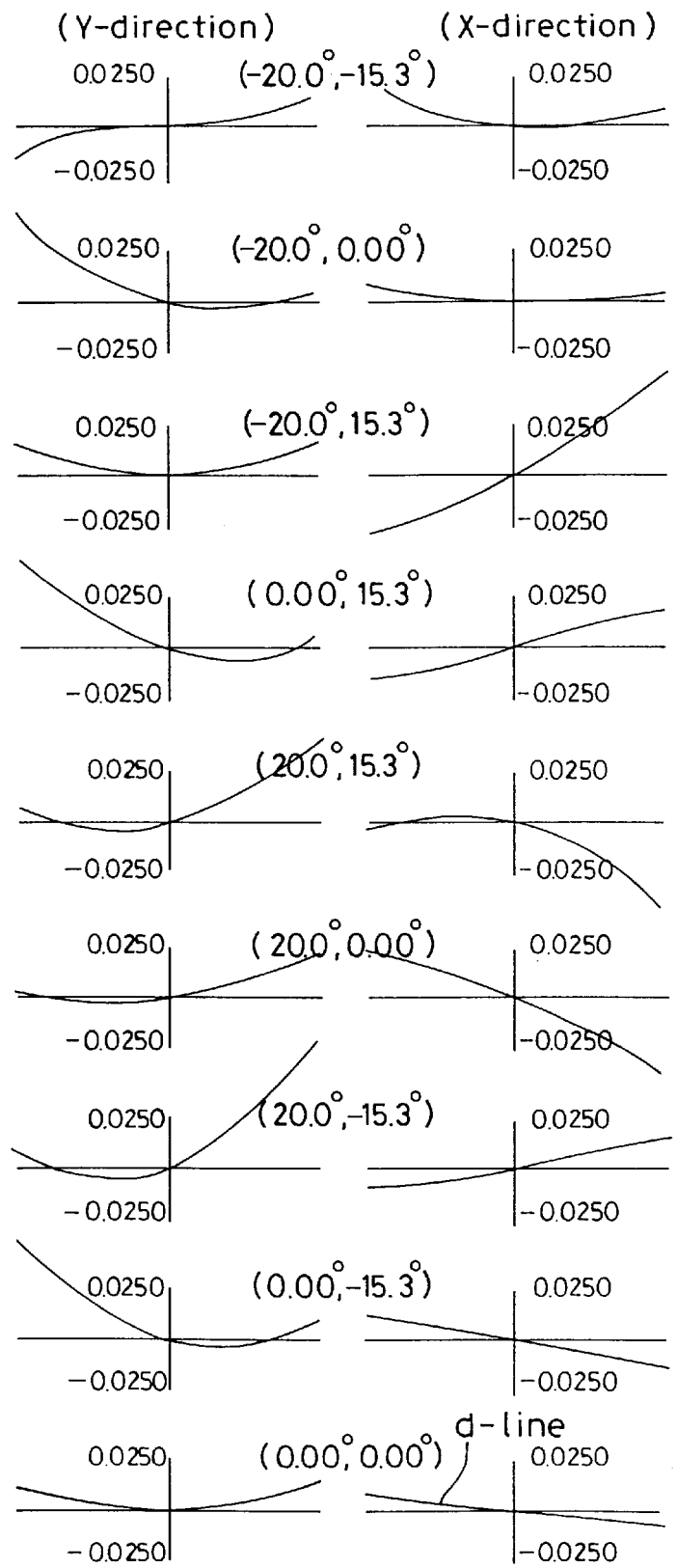
FIG. 7 is an aberrational diagram illustrating lateral aberrations in Example 5.

Lateral aberrations in Example 5 are graphically shown in FIG. 7. In the aberrational diagram, the parenthesized numerals denote [horizontal (X-direction) field angle, vertical (Y-direction) field angle], and lateral aberrations at the field angles are shown. FIG. 8 is an aberrational diagram showing image distortion in Example 5. In the aberrational diagram, the abscissa axis represents the image height in the direction X, and the ordinate axis represents the image height in the direction Y.

The values of the conditions (0–1) to (9–1) in each of the above-described examples are shown below. In the table below, S3 and S4, which denote surface Nos., show the values of the second surface 4 as a first reflecting surface and the first surface 3 as a second reflecting surface, respectively.

| | Ex. 1 | Ex. 2 | Ex. 3 | Ex. 4 | Ex. 5 | Ex. 6 |
|---|---|---|---|---|---|---|
| (0-1) | 7.89° | 7.60° | 7.69° | 7.71° | 7.46° | 1.46° |
| (1-1)S3 | 0.002 | 0.002 | 0.016 | 0.013 | −0.001 | −0.004 |
| (1-1)S4 | −0.015 | −0.024 | 0.004 | 0.003 | −0.008 | −0.015 |
| (2-1) | −0.017 | −0.026 | −0.012 | −0.010 | −0.007 | −0.011 |
| (3-1)S3 | 0.000 | 0.005 | −0.006 | −0.005 | 0.000 | −0.000 |
| (3-1)S4 | 0.008 | 0.011 | −0.013 | −0.011 | 0.001 | 0.000 |
| (4-1) | 0.008 | 0.006 | −0.006 | −0.005 | 0.001 | 0.000 |
| (5-1)S3 | 0.000 | 0.000 | 0.000 | 0.000 | 0.000 | −0.001 |
| (5-1)S4 | −0.005 | −0.005 | −0.005 | −0.005 | −0.004 | −0.008 |
| (6-1)S3 | 0.000 | −0.002 | −0.003 | −0.002 | 0.000 | −0.000 |
| (6-1)S4 | −0.001 | −0.003 | −0.002 | −0.001 | −0.001 | −0.000 |
| (7-1)S3 | 1.485 | 1.482 | 1.512 | 1.486 | 1.122 | 2.011 |
| (7-1)S4 | 1.011 | 1.009 | 1.029 | 1.012 | 0.365 | 2.071 |
| (8-1)S3 | 1.245 | 1.257 | 1.256 | 1.221 | 0.826 | 1.086 |
| (8-1)S4 | 0.586 | 0.588 | 0.591 | 0.574 | 0.013 | 0.256 |
| (9-1) | 1.0306 | 1.0426 | 1.0207 | 1.0096 | 0.9886 | 1.0272 |

Figure 10:
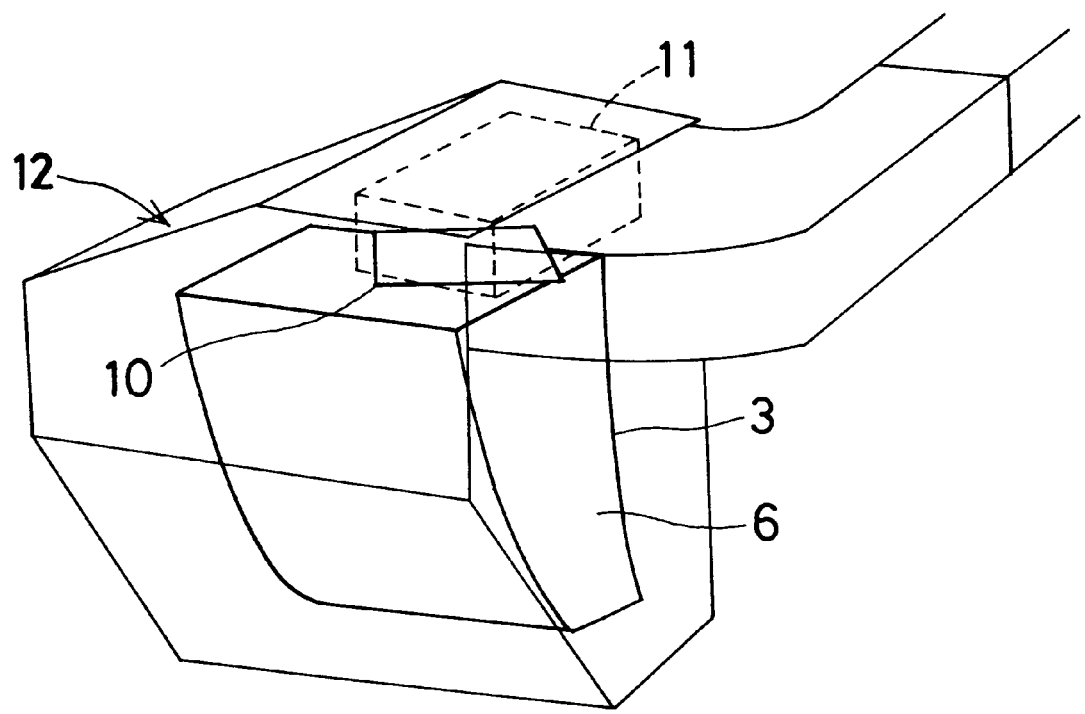
FIG. 10 is a diagram for explaining an advantage obtained when a decentered optical system according to the present invention is used in a head-mounted image display apparatus.

Incidentally, a decentered optical system according to the present invention can be used, for example, as an ocular optical system in a head-mounted image display apparatus, or as an image-forming optical system in a camera, an endoscope or the like, as stated above. FIGS. 9(a) and 9(b) show comparatively two arrangements in each of which a decentered optical system is used as an ocular optical system in a head-mounted image display apparatus. FIG. 9(a) shows an arrangement in which a decentered optical system 6' is constructed of three-dimensional or other surfaces having a plane of symmetry. FIG. 9(b) shows an arrangement in which a decentered optical system 6 is constructed by using at least one three-dimensional surface which is three-dimensionally decentered and has no plane of symmetry according to the present invention. As shown in FIG. 9(a), when the decentered optical system 6' is constructed of three-dimensional or other surfaces having a plane of symmetry, an image display device 10, e.g. an LCD (liquid Crystal Display), is disposed in bilateral symmetry with respect to the decentered optical system (ocular optical system) 6', and the longitudinal axis of the image display device 10 is perpendicular to the plane of symmetry. In contrast, when the decentered optical system (ocular optical system) 6 is constructed by using at least one three-dimensional surface which is three-dimensionally decentered and has no plane of symmetry according to the present invention, the LCD 10 is offset to one side, and moreover, the long or short sides thereof are not perpendicular to the plane of symmetry [although there is no plane of symmetry in this arrangement, it is shown for comparison with FIG. 9(a)]. Accordingly, when the decentered optical system 6 is used in a head-mounted image display apparatus, for example, as shown schematically in FIG. 10, a portion that is vacant as a result of the deviation of the LCD 10 to one side becomes a dead space. Therefore, that portion of the casing which corresponds to the dead space can be cut as indicated by reference numeral 12 to thereby achieve a reduction in the size of the apparatus. In FIG. 10, reference numeral 11 denotes an electric board. It is also possible to dispose the electric board 11 in the dead space to thereby achieve a reduction in the size of the casing.

Figure 11:
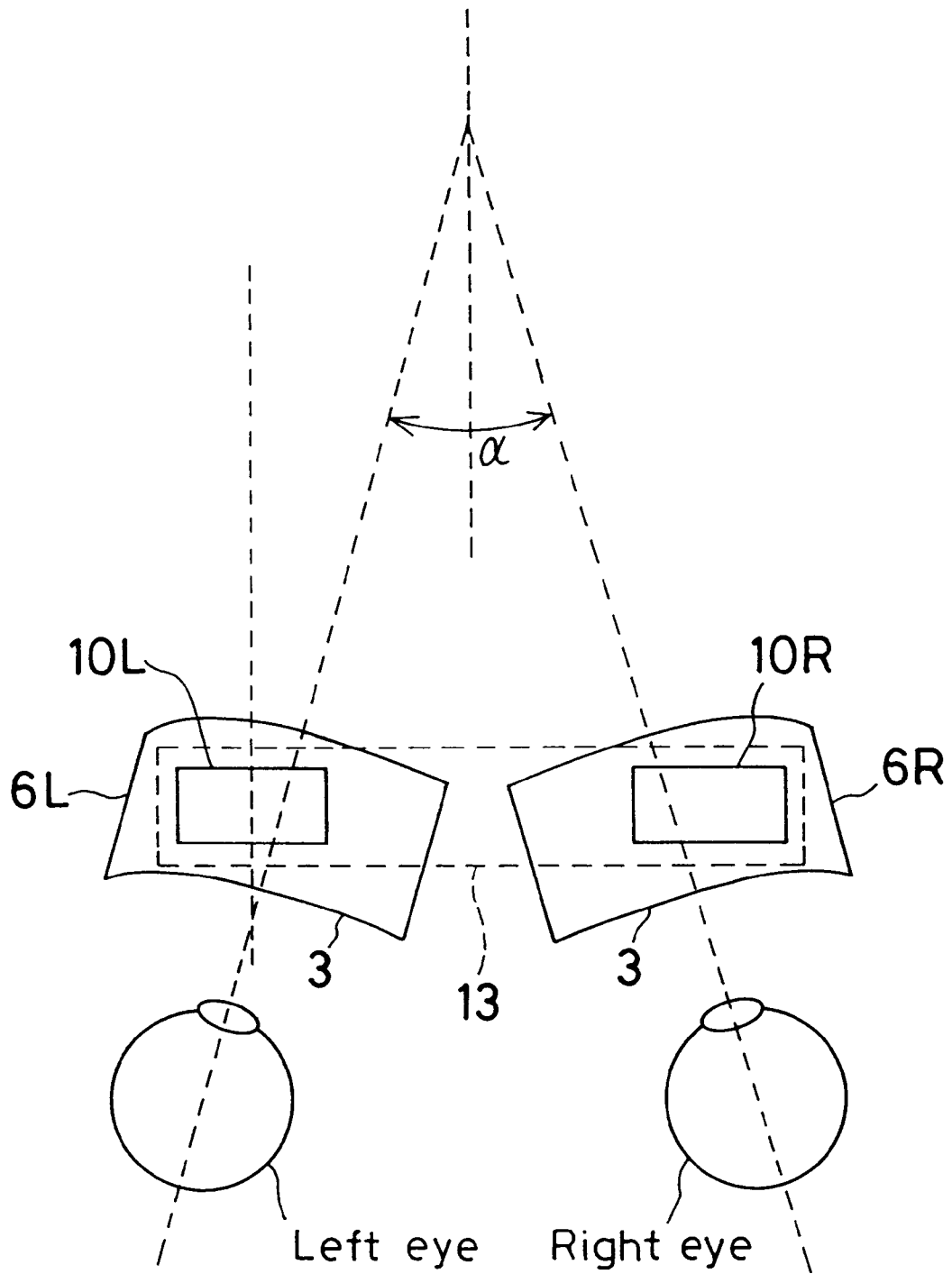
FIG. 11 is a diagram for explaining another advantage obtained when a decentered optical system according to the present invention is used in a head-mounted image display apparatus.

As shown in FIG. 11, when decentered optical system 6L and 6R according to the present invention are used as left and right ocular optical systems of a head-mounted image display apparatus that enables the observer to see with both eyes, the left and right decentered optical systems 6L and 6R are inclined toward each other so as to face in respective directions intersecting the center of the vergence angle (α) between the left and right eyes that is determined by the interpupillary distance. In this case, if the decentered optical systems 6L and 6R are formed by using three-dimensional surfaces having no plane of symmetry, the left and right LCDs 10L and 10R are skewed with respect to the decentered optical systems 6L and 6R. However, it is possible to dispose both the LCDs 10L and 10R in a straight line and to illuminate the left and right LCDs 10L and 10R by a single elongate back light 13 as shown by the dashed line.

Figure 12:
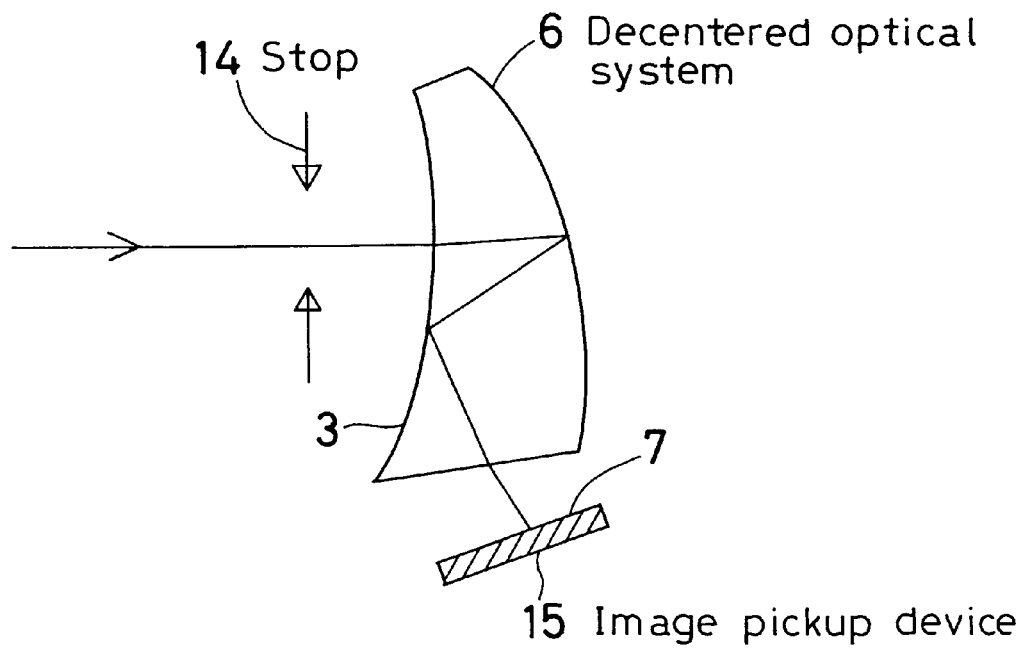
FIGS. 12(a) and 12(b) show two types of arrangement in which a decentered optical system according to the present invention is used as an image-forming optical system.
Figure 12:
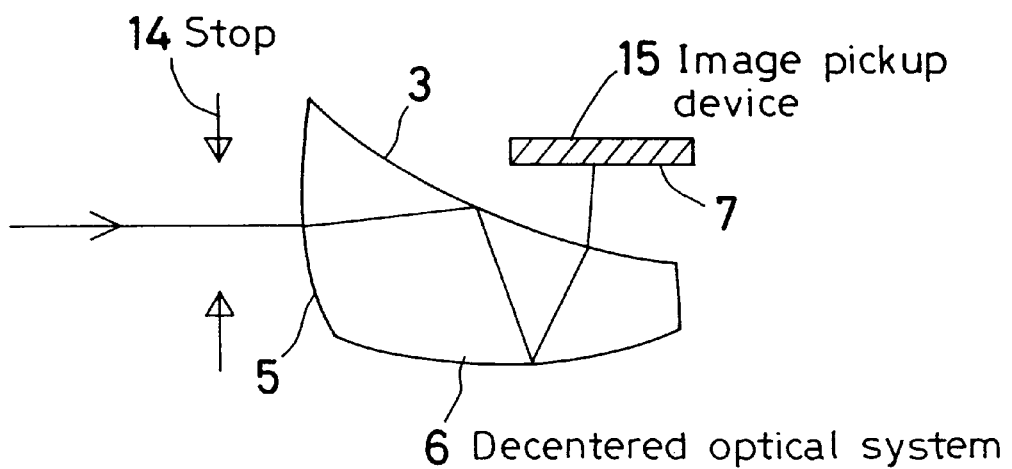
Figure 13:
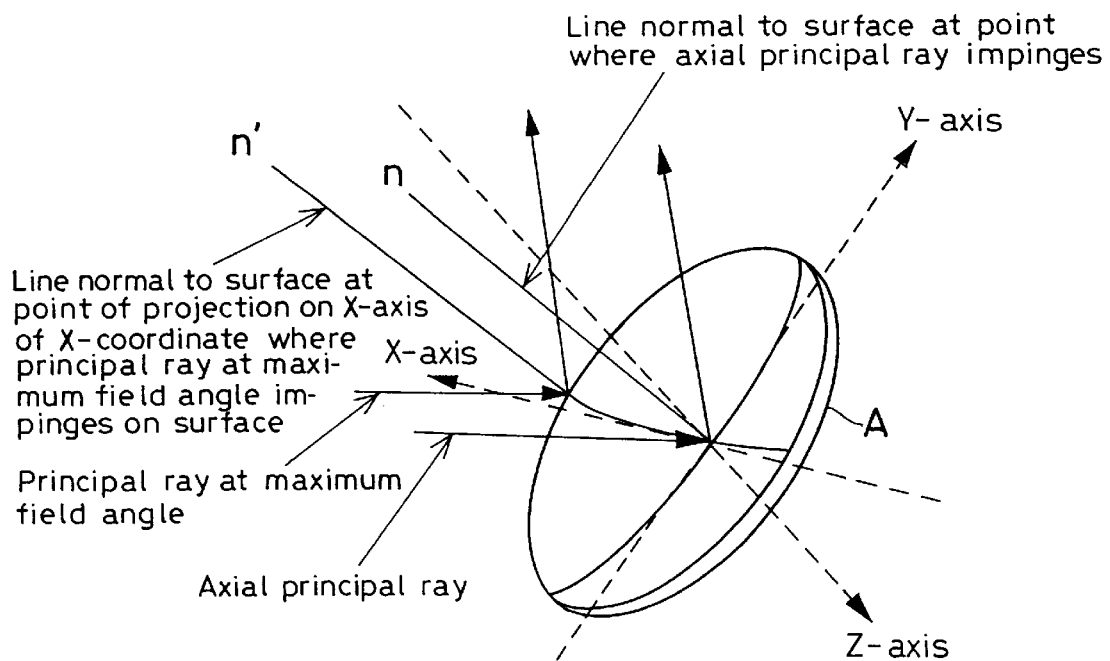
FIGS. 13(a) and 13(b) are diagrams for explaining parameter DY used in the present invention.
Figure 13:
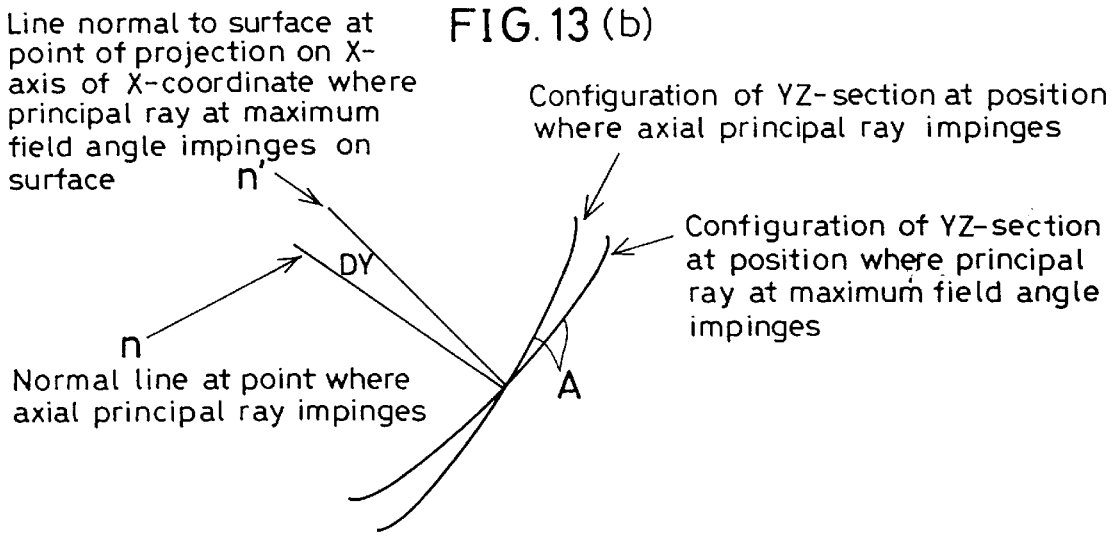
Figure 14A:
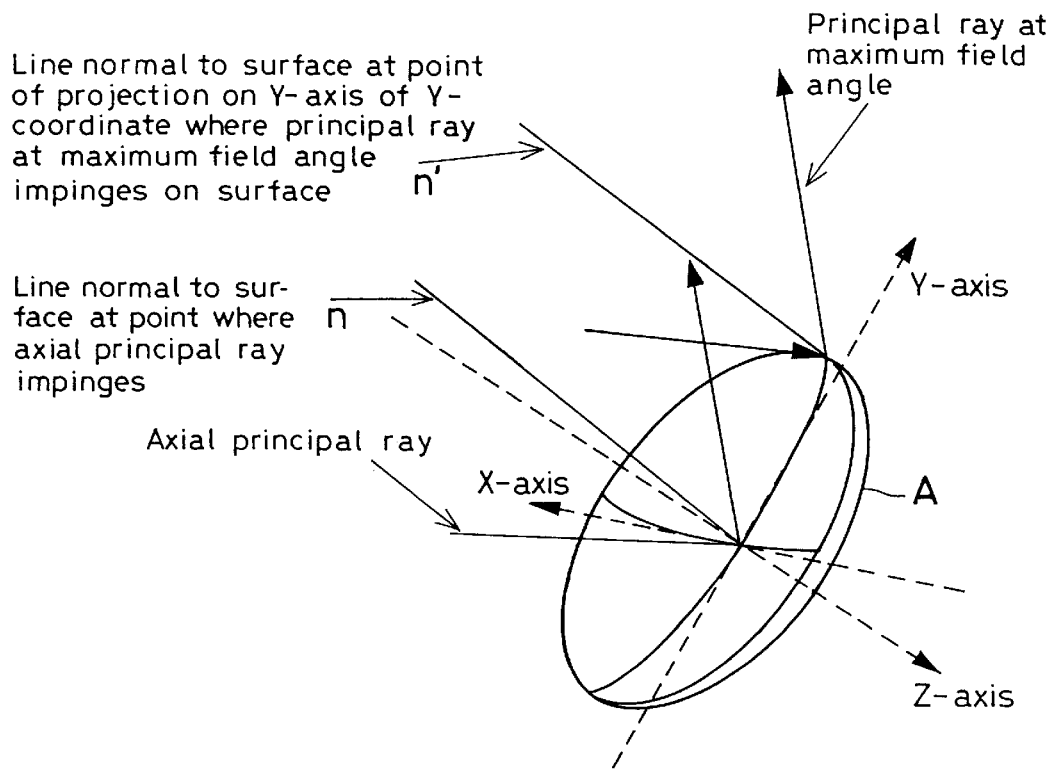
FIGS. 14(a) and 14(b) are diagrams for explaining parameter DX used in the present invention.
Figure 14B:
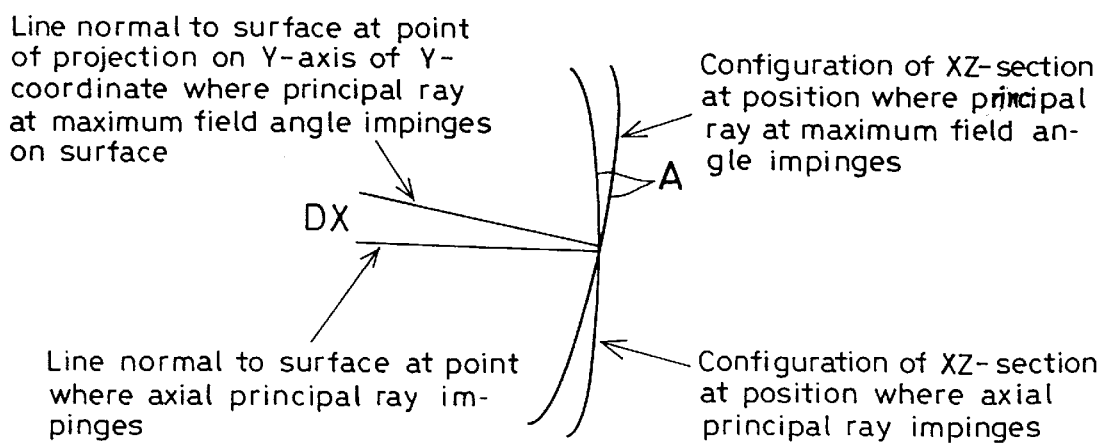

In a case where a decentered optical system according to the present invention is used as an image-forming optical system, it is possible to adopt arrangements such as those shown in FIG. 12(a) and 12(b) (the same is true of an arrangement in which a decentered optical system is constructed of four or more surfaces). In the arrangement shown in FIG. 12(a), a stop 14 is disposed in front of the first surface 3. In the case of an electronic camera, an image pickup device 15, e.g. a CCD, is disposed in the image plane 7. In the case of a camera that uses a silver halide film, the film is disposed in the image plane 7. Light from a subject passes successively through the stop 14 and the decentered optical system 6 to form an image of the subject on the image pickup device 15 or the silver halide film. In the arrangement shown in FIG. 12(b), a stop 14 is disposed in front of the third surface 5. In the case of an electronic camera, an image pickup device 15, e.g. a CCD, is disposed in the image plane 7 of the decentered optical system 6. In the case of a camera that uses a silver halide film, the film is disposed in the image plane 7. Thus, an image of a subject is formed as in the case of the arrangement shown in FIG. 12(a).

In a case where an image-forming optical system arranged as shown in FIG. 12(a) or 12(b) is used in an endoscope, the image-forming optical system shown in FIG. 12(a) is used in a side-view or oblique-view type endoscope. In this case, the image pickup device 15 is disposed in the image plane 7. Alternatively, a relay lens or the entrance end surface of an image fiber guide is disposed in the image plane 7. The image-forming optical system shown in FIG. 12(b) is used in a direct-view type endoscope. In this case, the image pickup device 15 is disposed in the image plane 7.

Incidentally, the above-described image-forming optical system including a decentered optical system according to the present invention can be used in photographic apparatuses, particularly cameras, in which an object image formed by the image-forming optical system is received with an image pickup device, such as a CCD or a silver halide film, to take a photograph of the object. The image-forming optical system can also be used in endoscopes, binoculars, and microscopes. It is also possible to use the image-forming optical system as an objective optical system or an ocular optical system in an observation apparatus in which an object image is viewed through an ocular lens, for example, a finder unit of a camera, or as an ocular optical system or a relay optical system in a pair of binoculars or a microscope. Embodiments in which the present invention is applied to such apparatuses will be described below.

Figure 15:
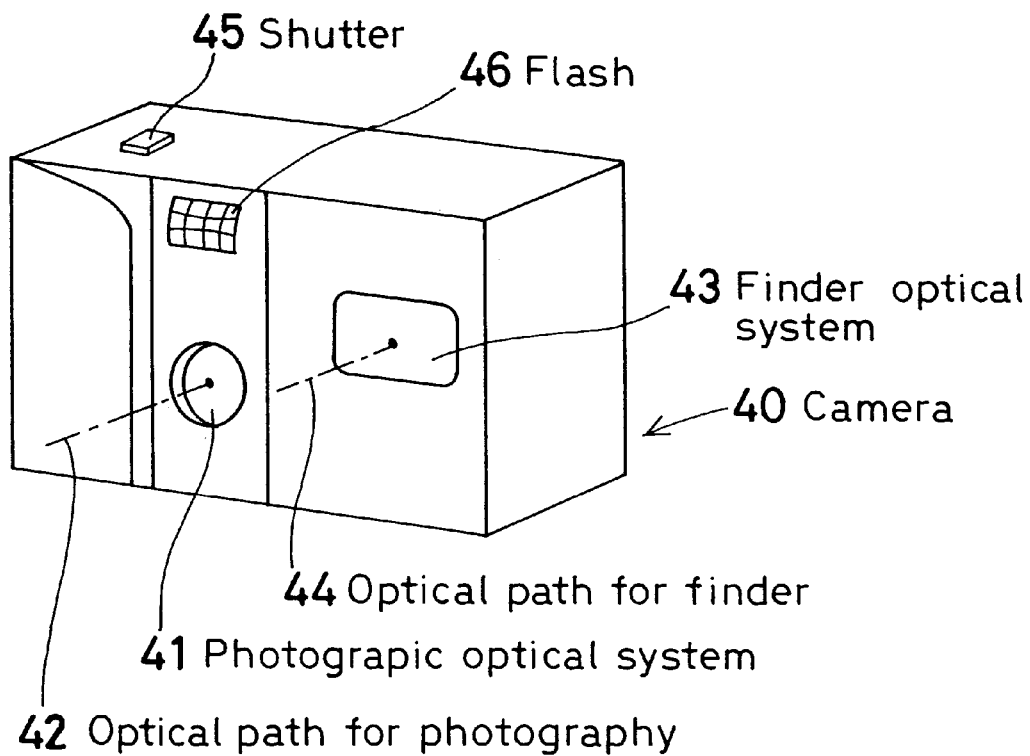
FIG. 15 is a perspective view showing the external appearance of an electronic camera to which an optical system according to the present invention is applied, as viewed from the front side thereof.
Figure 16:
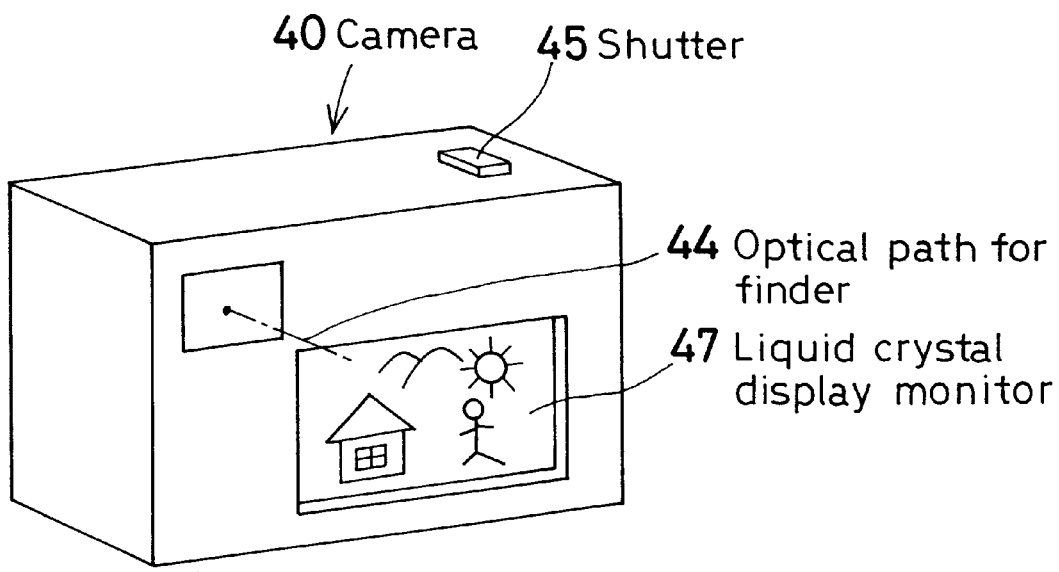
FIG. 16 is a perspective view of the electronic camera shown in FIG. 15, as viewed from the rear side thereof.

FIGS. 15 to 17 are conceptual views showing an arrangement in which the image-forming optical system according to the present invention is incorporated into an objective optical system of a finder unit of an electronic camera. FIG. 15 is a perspective view showing the external appearance of an electronic camera 40 as viewed from the front side thereof. FIG. 16 is a perspective view of the electronic camera 40 as viewed from the rear side thereof. FIG. 17 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera may be arranged in the form of a silver halide camera in which a silver halide film is disposed in place of the CCD 49.

Furthermore, an image-forming optical system according to the present invention is placed in the optical path 44 for the finer as an objective optical system 53 for the finder. The image-forming optical system includes two decentered optical systems 6 and 6' according to the present invention, together with a stop 20 that is placed therebetween. In addition, a cover lens 54 having a negative power is provided as a cover member to enlarge the field angle. It should be noted that the cover lens 54 and a prism 10 that is closer to the object side than the stop 20 of the image-forming optical system constitute a front unit GF of the objective optical system 53 for the finder. A prism 20 that is closer to the image side than the stop 20 of the image-forming optical system constitutes a rear unit GR of the objective optical system 53 for the finder. An object image produced by the objective optical system 53 for the finder is formed on a view frame 57 of a Porro prism 55, which is an image-erecting member. It should be noted that the view frame 57 is placed between a first reflecting surface 56 and a second reflecting surface 58 for the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 in the description of the arrangement shown in FIG. 17, the objective optical system 48 for photography may be formed by using an image-forming optical system including a decentered optical system according to the present invention, besides a refracting coaxial optical system.

FIG. 18 is a conceptual view showing an arrangement in which an image-forming optical system including two decentered optical systems 6 and 6' according to the present invention, together with a stop 20 disposed therebetween, is incorporated into an objective optical system 48 for photography of an electronic camera 40, and in which a decentered optical system 6" according to the present invention is used in an ocular optical system 59 for viewing an image displayed on a liquid crystal display device. In this example, two decentered optical systems 6 and 6' according to the present invention are used in an objective optical system 48 for photography placed in an optical path 42 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered optical system 6" according to the present invention. In this example, the ocular optical system 59 has three surfaces, i.e. an entrance surface 62, a reflecting surface 63, and a surface 64 serving as both reflecting and refracting surfaces. At least one of the two reflecting surfaces 63 and 64, preferably each of them, is formed from a rotationally asymmetric curved surface with no plane of symmetry that gives a power to a light beam and corrects aberrations due to decentration.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

In the front unit GF of the image-forming optical system according to the present invention, the surface closest to the object side may be used as a cover member instead of providing a cover member separately. In this case, however, the entrance surface of the decentered prism 6 is the closest to the object side in the front unit GF. Because the entrance surface is decentered with respect to the optical axis, if this surface is placed on the front side of the camera, it gives the illusion that the photographic center of the camera 40 is deviated from the subject when the entrance surface is seen from the subject side (under normal circumstances, the subject feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface from the subject side, and allowing the subject to be photographed with the same feeling as in the case of the existing cameras.

Figure 19A:
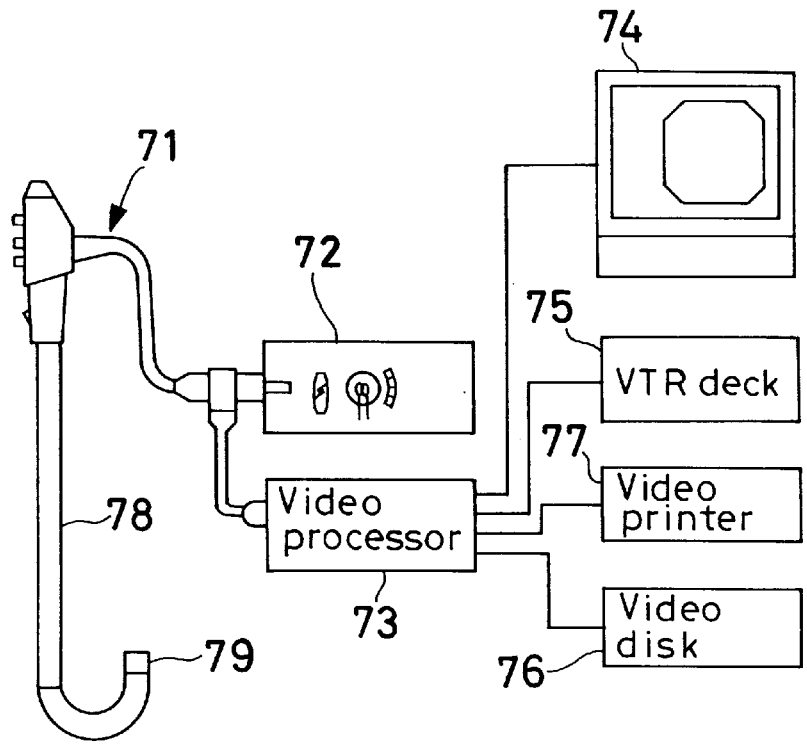
FIG. 19 is a conceptual view of a video endoscope to which an optical system according to the present invention is applied.
Figure 19B:
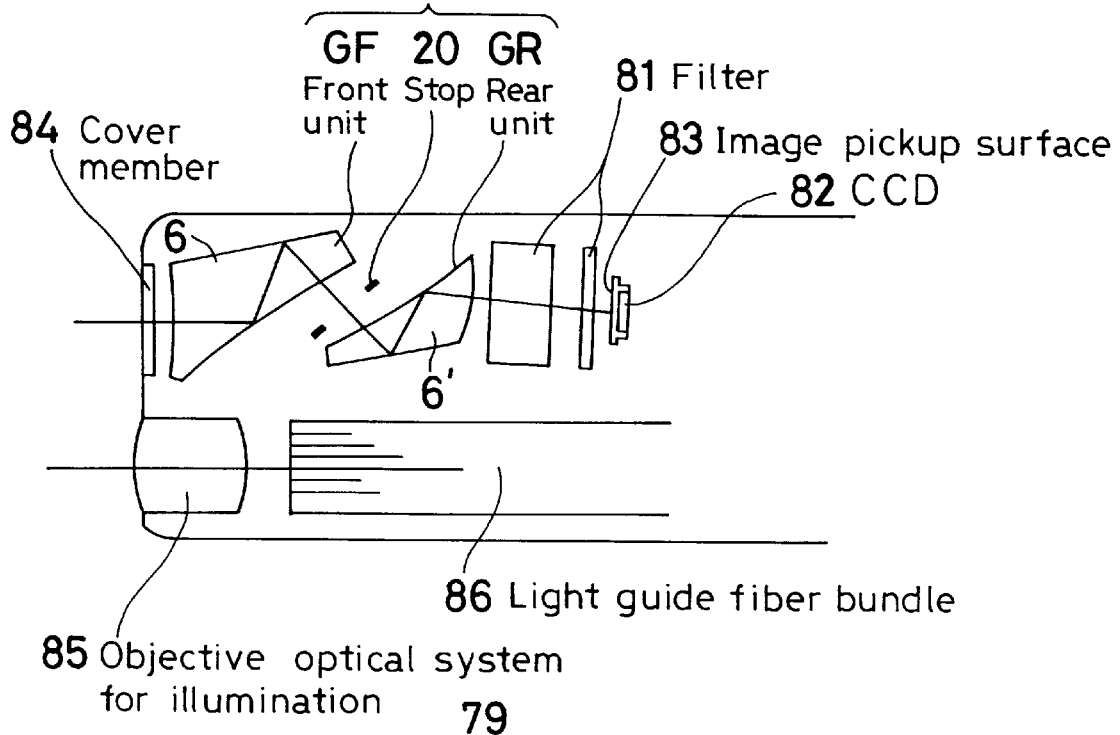

FIG. 19 is a conceptual view showing an arrangement in which an image-forming optical system according to the present invention is incorporated into an objective optical system 80 in an observation system of a video endoscope system. The image-forming optical system includes two decentered optical systems 6 and 6' according to the present invention, together with a stop 20 placed therebetween. As shown in part (a) of FIG. 19, the video endoscope system includes a video endoscope 71, a light source unit 72 for supplying illuminating light, a video processor 73 for executing processing of signals associated with the video endoscope 71, a monitor 74 for displaying video signals outputted from the video processor 73, a VTR deck 75 and a video disk 76, which are connected to the video processor 73 to record video signals and so forth, and a video printer 77 for printing out video signals in the form of images. The video endoscope 71 has an insert part 78 with a distal end portion 79. The distal end portion 79 is arranged as shown in part (b) of FIG. 19. A light beam from the light source unit 72 passes through a light guide fiber bundle 86 and illuminates a part to be observed through an objective optical system 85 for illumination. Light from the part to be observed enters an objective optical system 80 for observation through a cover member 84. Thus, an object image is formed by the objective optical system 80. The object image is formed on an image pickup surface 83 of a CCD 82 through a filter 81, e.g. a low-pass filter or an infrared cutoff filter. Furthermore, the object image is converted into an image signal by the CCD 82. The image signal is displayed directly on the monitor 74 by the video processor 73. In addition, the image signal is recorded in the VTR deck 75 and on the video disk 76 and also printed out in the form of an image from the video printer 77.

The endoscope arranged as stated above can be constructed with a minimal number of optical members. Accordingly, a high-performance and low-cost endoscope can be realized. Moreover, because the front unit GF and the rear unit GR, which constitute the objective optical system 80, are arranged in series in the direction of the longitudinal axis of the endoscope, the above-described advantageous effects can be obtained without hindering the achievement of a reduction in the diameter of the endoscope.

FIG. 20 is a diagram showing an optical system of a pair of binoculars to which the decentered optical system according to the present invention is applied. Part (a) of FIG. 20 shows a Porro prism type, and part (b) of FIG. 20 shows a roof prism type. A decentered optical system having an image-forming action according to the present invention is used in at least one prism that constitutes a Porro prism PP or a roof prism DP, thereby making it possible to construct a pair of binoculars that do not need either or both of an objective Ob and an eyepiece Ep. In this case, if a roof prism DP is used, it is possible to construct a pair of binoculars having a reduced overall length. The use of a Porro prism PP makes it possible to construct a pair of binoculars having a reduced thickness.

Figure 21:
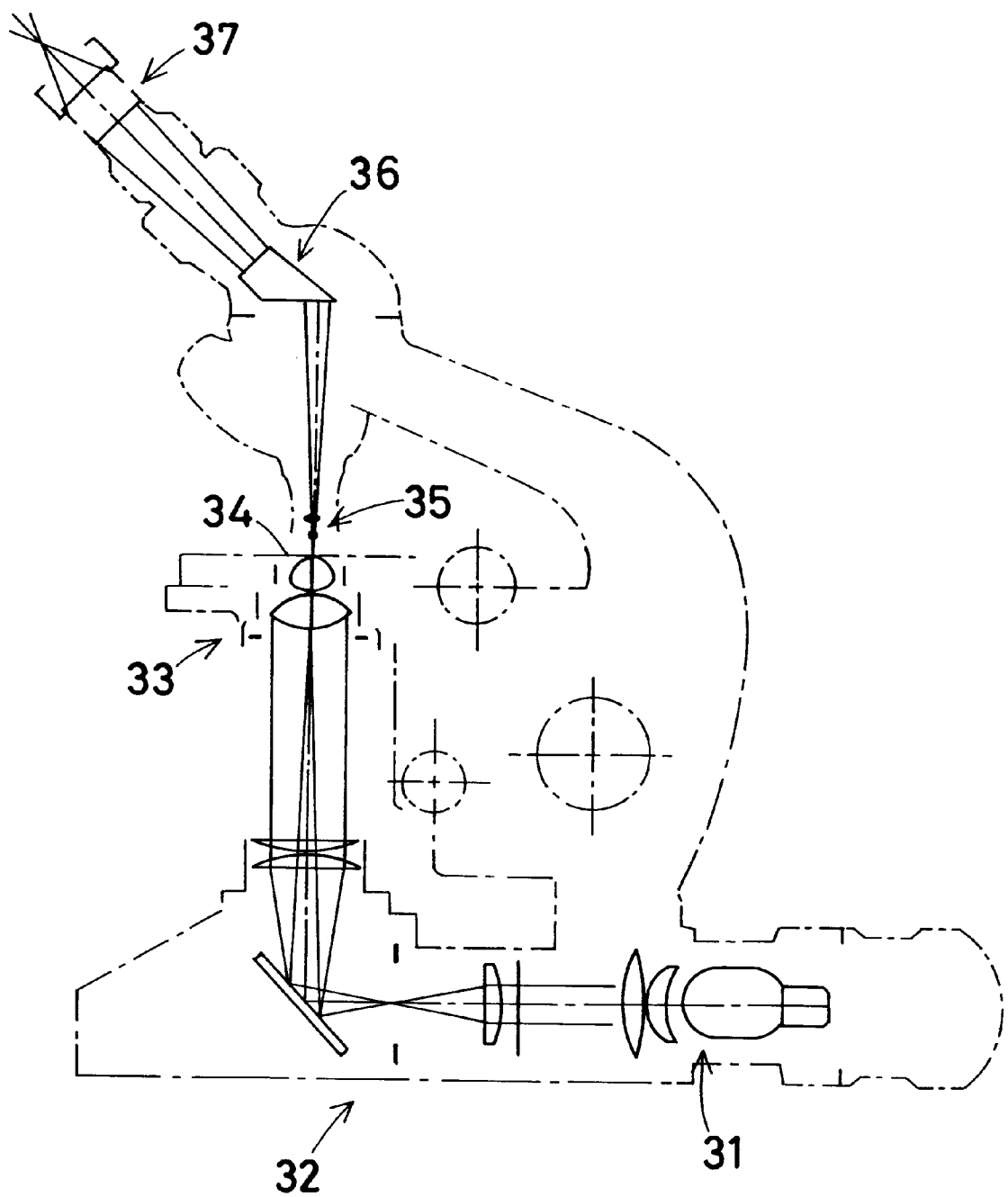
FIG. 21 is a diagram showing an optical system of a microscope to which the present invention is applicable.
Figure 22:
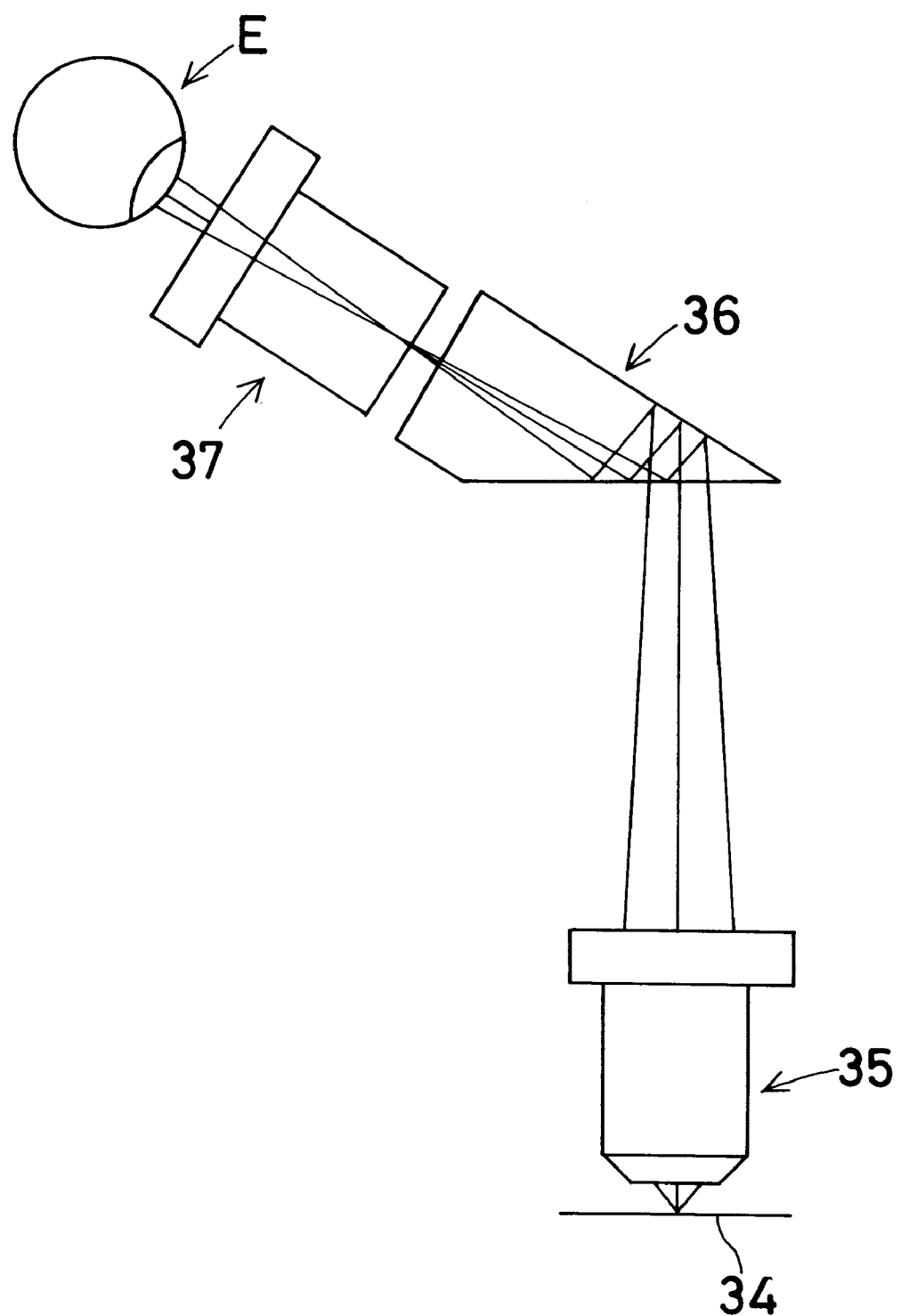
FIG. 22 is a diagram showing an essential part of FIG. 21.

FIG. 21 is a diagram showing the whole optical system of a microscope. FIG. 22 is a diagram showing an essential part of the optical system of the microscope. The microscope optical system includes an illuminating optical system 32 that concentrates and relays light from a light source 31, a condenser optical system 33 that applies light from the illuminating optical system 32 to a sample on a sample plane 34, an objective optical system 35 that forms an enlarged image of the sample, a deflecting prism 36 that deflects a light beam from the objective optical system 35 toward an observer's eyeball E, and an ocular optical system 37 that receives the light beam deflected by the deflecting prism 36 and that enlarges an intermediate image. A decentered optical system having an image-forming action according to the present invention can be used as the deflecting prism 36 so as to share the function of a part or the whole of one or two of the objective optical system 35, the ocular optical system 37 and the relay optical system.

As will be clear from the foregoing description, according to the present invention, a rotationally asymmetric surface is formed from a curved surface having no plane of symmetry. Therefore, it is possible to correct rotationally asymmetric aberration with no plane of symmetry that is produced by a three-dimensionally decentered optical system. Accordingly, it is possible to provide a decentered prism optical system or the like which is compact and has minimal aberrations and which is suitable for use as an ocular optical system in a head-mounted image observation apparatus or the like or as an image-forming optical system.

What we claim is:

1. An ocular optical system comprising:

an image-forming member that forms an observation image; and a decentered optical system that leads said observation image to a pupil;

said decentered optical system having at least one transmitting surface and at least one reflecting surface, wherein a space lying between these surfaces is filled with a medium having a refractive index larger than 1;

said decentered optical system having at least one optical surface formed form a rotationally asymmetric curved surface having no plane of symmetry.

2. An ocular optical system according to claim 1, wherein said rotationally asymmetric curved surface having no plane of symmetry is provided on at least one reflecting surface of said decentered optical system.

3. An ocular optical system according to claim 2, wherein said reflecting surface is reflectively coated with a thin film of a metal, for example, aluminum or silver, or a multilayer dielectric film.

4. An ocular optical system according to claim 2, wherein said reflecting surface is a totally reflecting surface.

5. A head-mounted image observation apparatus having an ocular optical system as defined in any of claims 1 to 4, and image-forming means for displaying the observation image in the form of an electronic image.

6. A camera having image-forming means including an image-forming optical system that forms an object image, and an ocular optical system as defined in any of claims 1 to 4, said ocular optical system being adapted to view said object image as an observation image.

7. A camera having image-forming means for displaying an object image in the form of an electronic image, and an ocular optical system as defined in any of claims 1 to 4, said ocular optical system being adapted to view said electronic image as an observation image.

8. An image-forming optical system comprising:

a decentered optical system having at least one transmitting surface and at least one reflecting surface, wherein a space lying between these surfaces is filled with a medium having a refractive index larger than 1, said decentered optical system having at least one optical surface formed form a rotationally asymmetric curved surface having no plane of symmetry.

9. An image-forming optical system according to claim 8, wherein said rotationally asymmetric curved surface having no plane of symmetry is provided on at least one reflecting surface of said decentered optical system.

10. An image-forming optical system according to claim 9, wherein said reflecting surface is reflectively coated with a thin film of a metal, for example, aluminum or silver, or a multilayer dielectric film.

11. An image-forming optical system according to claim 9, wherein said reflecting surface is a totally reflecting surface.

12. An endoscope having an image-forming optical system as defined in any of claims 8 to 11, and an image pickup device that receives an object image formed by said image-forming optical system.

13. An endoscope having an image-forming optical system as defined in any of claims 8 to 11, and an image fiber guide that receives an object image formed by said image-forming optical system.

14. An endoscope having an image-forming optical system as defined in any of claims 8 to 11, and a relay lens that receives an object image formed by said image-forming optical system.

15. An electronic camera having an image-forming optical system as defined in any of claims 8 to 11, and an image pickup device that receives an object image formed by said image-forming optical system.

16. An electronic camera according to claim 15, which has a liquid crystal display monitor that observably displays the object image received by said image pickup device.

17. A camera where an object image produced by an image-forming optical system as defined in any of claims 8 to 11 is formed on a film plane to take a photograph of an object.

18. A camera having an image-forming optical system as defined in any of claims 8 to 11, and an ocular optical system for viewing an object image formed by said image-forming optical system.

19. A pair of binoculars comprising a right optical system for leading an object image to a right eye, and a left optical system for leading an object image to a left eye, said right optical system including a right decentered optical system acting as a part of an image-forming optical system and/or as a part of an ocular optical system, said right decentered optical system being placed in an image erecting prism, said left optical system including a left decentered optical system acting as a part of an image-forming optical system and/or as a part of an ocular optical system, said left decentered optical system being placed in an image erecting prism, said right decentered optical system and said left decentered optical system each having at least one transmitting surface and at least one reflecting surface, wherein a space lying between these surfaces is filled with a medium having a refractive index larger than 1, said right decentered optical system and said left decentered optical system each having at least one optical surface formed from a rotationally asymmetric curved surface having no plane of symmetry.

20. A microscope comprising an image erecting prism for erecting an object image formed by an objective optical system, and an ocular optical system, said image erecting prism containing a decentered optical system acting as a part of said ocular optical system, said decentered optical system having at least one transmitting surface and at least one reflecting surface, wherein a space lying between these surfaces is filled with a medium having a reflective index larger than 1, said decentered optical system having at least one optical surface formed from a rotationally asymmetric curved surface having no plane of symmetry.

* * * * *